United States Patent [19]
Hayashi et al.

[11] Patent Number: 6,108,106
[45] Date of Patent: Aug. 22, 2000

[54] DOCUMENT/IMAGE DATA READER

[75] Inventors: Yasuhiro Hayashi, Sayama; Hideyuki Kawashima; Tomoshige Inuyama, both of Tokyo; Toshiyuki Inage, Kawagoe; Hideki Arai, Tokorozawa; Junichi Miyata; Shingo Ono, both of Tokyo, all of Japan

[73] Assignee: Citizen Watch Co., Ltd., Tokyo, Japan

[21] Appl. No.: 09/091,139

[22] PCT Filed: Oct. 23, 1997

[86] PCT No.: PCT/JP97/03856

§ 371 Date: Jun. 8, 1998

§ 102(e) Date: Jun. 8, 1998

[87] PCT Pub. No.: WO98/18252

PCT Pub. Date: Apr. 30, 1998

[30] Foreign Application Priority Data

| Oct. 23, 1996 | [JP] | Japan | 8-280530 |
| Feb. 3, 1997 | [JP] | Japan | 9-020251 |
| Feb. 3, 1997 | [JP] | Japan | 9-020252 |
| May 12, 1997 | [JP] | Japan | 9-121118 |

[51] Int. Cl.$^7$ .............. H04N 1/024; H04N 1/04
[52] U.S. Cl. .............. 358/473; 358/496
[58] Field of Search .............. 358/473, 496, 358/498, 474, 471, 505, 506, 487; 382/313; 361/683, 686; 271/3.14; 250/234–236; H04N 1/04

[56] References Cited

U.S. PATENT DOCUMENTS

| 5,644,663 | 7/1997 | Saito et al. | 382/313 |
| 5,739,923 | 4/1998 | Kawahara | 358/473 |
| 5,865,431 | 2/1999 | Ma | 358/473 |
| 5,943,451 | 8/1999 | Lee | 382/313 |

FOREIGN PATENT DOCUMENTS

| 0 548 374 | 6/1993 | European Pat. Off. |
| 0 587 316 | 3/1994 | European Pat. Off. |
| 63-83861 | 6/1988 | Japan |
| 64-34051 | 2/1989 | Japan |
| 9-116663 | 5/1997 | Japan |
| 2 178263 | 2/1987 | United Kingdom |

*Primary Examiner*—Cheukfan Lee
*Attorney, Agent, or Firm*—Smith, Gambrell & Russell, LLP

[57] ABSTRACT

When the sensor block 10 is placed on the roller block 20 and the reading surface of the reading sensor 31 faces the aforementioned driving roller 28, then paper is automatically fed with the driving roller 28 and text and image data are read with the reading sensor 31. On the other hand, when the sensor block 10 is reversed 180° and placed again over the roller block 20, then the reading sensor 31 reads text and images when the sensor block 10, arranged beneath the roller block 20, are moving or the document by manual operation.

31 Claims, 32 Drawing Sheets

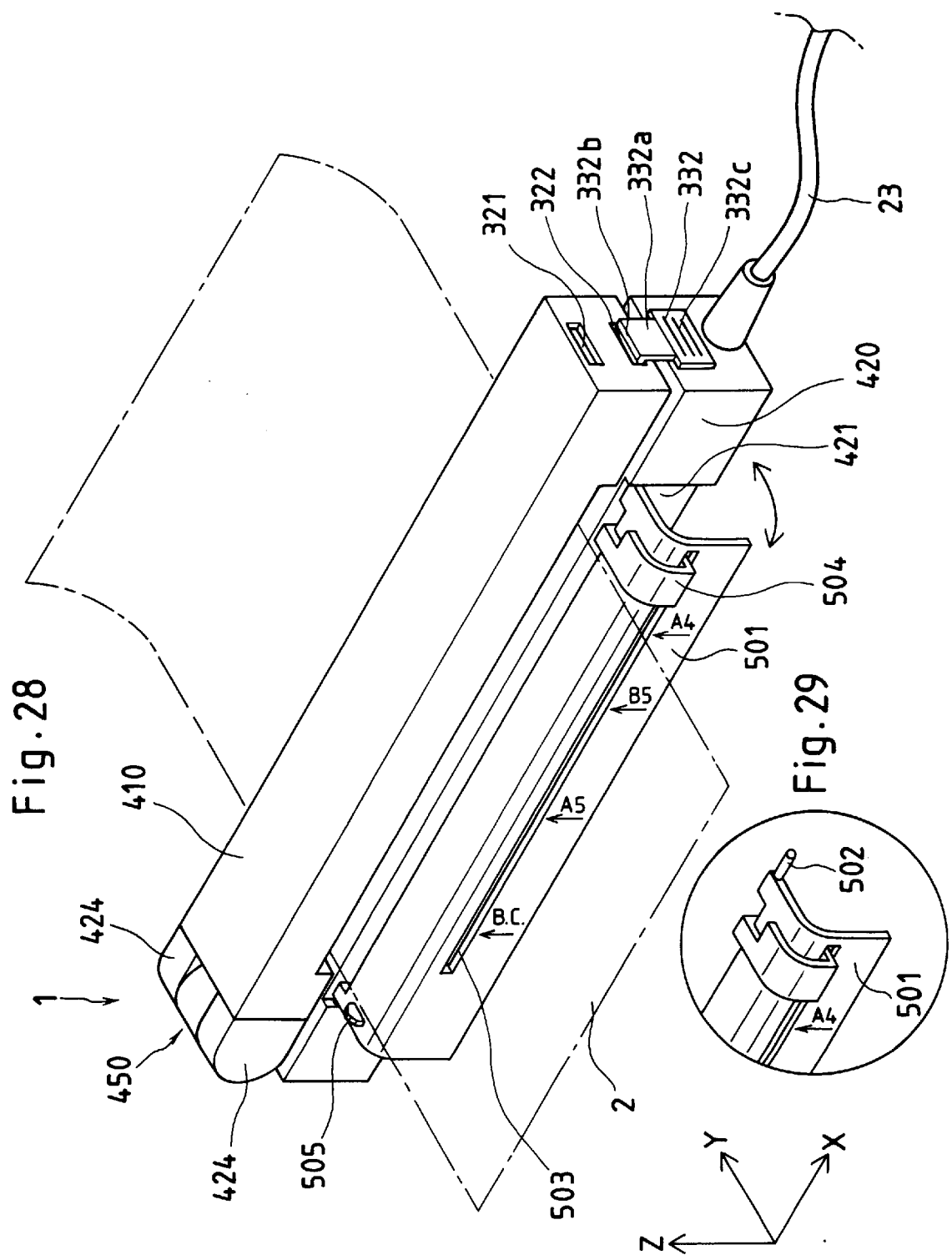

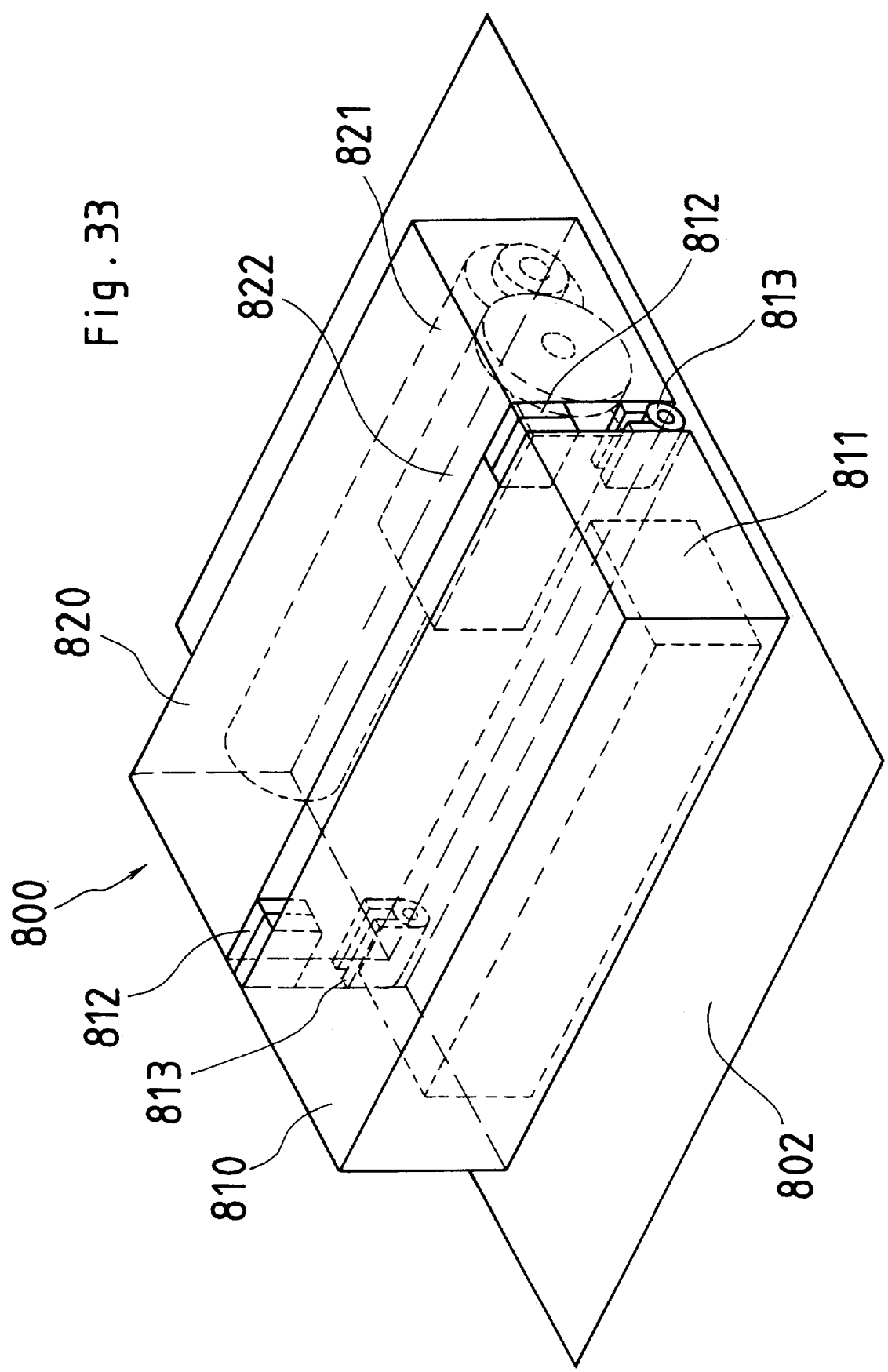

DOCUMENT/IMAGE DATA READER

TECHNICAL FIELD

The present invention relates to an apparatus for reading character and image data such as text or graphic inscribed on each page of a book or sheet of paper, and more particularly to an apparatus for reading character and image data having two modes, an automatic feed mode for feeding the document automatically, and a manual feed mode for manually scanning the document or image data.

BACKGROUND ART

Conventional apparatuses for reading character and image data, such as one used in a facsimile machine or the like, can selectively be operated in an automatic feed mode in which a document to be read is moved relative to a reading sensor by a built-in paper feed mechanism to read the image data, and a manual feed mode in which a document is manually scanned to read the image data, as disclosed in Japanese Patent Application Laid-open No. 3-167958, for example. The latter mode may be a travelling type wherein the reading apparatus travels over a static document to read the document.

Next, the conventional apparatus for reading character and image data is explained using FIGS. 32 and 33.

FIG. 32 is a perspective view showing the state where the conventional apparatus for reading character and image data 800 is used in automatic feed mode. FIG. 33 is a perspective view showing the state where it is used in manual feed mode.

A sensor unit 811 for reading image data of a document is built in a sensor block 810; a driving roller 821 for moving the document and a motor 822 for driving the driving roller 821 are built in a roller block 820. The sensor block 810 and roller block 820 are rotatably connected with a hinge (rotatable connecting member) 813 so that switching can be made between the automatic feed mode and manual feed mode. A lock 812 is a member for fixedly interlocking the sensor block 810 and roller block 820 in manual feed mode when the apparatus is to be used in this mode.

Next, the operation of the conventional apparatus for reading document and image data is explained using FIGS. 32 and 33.

When used in the automatic feed mode as shown in FIG. 32, the sensor unit 811 is positioned opposite to and so as to be able to contact the driving roller 821; a document 802 is inserted therebetween so that the rotation of the driving roller 821 causes the document 802 to move, and the character and image data of the document are read.

Moreover, the sensor unit 811 comprises a light source such as a plurality of light emitting diodes (LED), converging lens and a line sensor (not shown) for reading light reflected by the document 802. The sensor unit 811 is constituted so that the reading surface for reading with the line sensor is extremely close to the document.

Next, when used in the manual feed mode as shown in FIG. 33, the reading surface of the sensor unit 811 and the document driving surface of the driving roller 821 are placed in a coplanar arrangement, so that the reading surface of the sensor unit 811 is in contact with the document 802, which is laid flat. The entire apparatus travels over the document 802 because of the rotation of the driving roller 821 protruding slightly from the lower surface of the roller block 820, thereby reading the character and image data. The apparatus is structured so that power is supplied with a soft cord or from built-in rechargeable batteries.

Also, the lock 812 is designed to serve not only as a mechanical connection when the apparatus is operated in manual mode but also as an electrical connection to power source or signal line. When the apparatus is operated in automatic feed mode, however, the upper and lower parts of the lock 812 are connected with a cable (not shown).

In the foregoing prior art, however, both the sensor block and roller block are arranged opposite to the document when in the manual feed mode. Therefore, the document has to face not only the bottom of the sensor block but also the bottom of the roller block, so that, an area including the area for the roller block is required for reading the document. Also, such a reading apparatus, when used in the manual feed mode, is spread over the document, covering a large surface area. Therefor it is difficult to hold the reading apparatus by hand, thereby giving adverse effect on operability.

Furthermore, for a reading apparatus comprising the sensor block 810 and roller block 820, which are designed to be either overlapped with each other or juxtaposed through an interposed hinge 813, it has been difficult to find an electrical connector suitable for connecting the roller block 820 and sensor block 810 to each ether.

DISCLOSURE OF THE INVENTION

It is an object of the present invention to provide an improved apparatus for reading character and image data, for solving the foregoing problem, in which the footprint size of the apparatus does not become large even when switched to manual feed mode from automatic feed mode, and which can be easily handled by a user and can minimize the area necessary for reading a document.

Further, it is another object of the present invention to provide an improved apparatus for reading character and image data with high reliability, which ensures electrical signal connection between the sensor block and the roller block, even when switching between the automatic feed mode and manual feed mode is done.

In order to achieve the foregoing objects, the apparatus for reading character and image data relating to the present invention comprises a sensor block housing a reading sensor for reading image data on a document; a roller block housing a driving roller for feeding the document and a motor for driving the driving roller; and coupling means for coupling said sensor block to said roller block in a first position, wherein the reading surface of the reading sensor of the sensor block faces the driving roller of said roller block, and also in a second position, wherein the reading surface of the reading sensor in the sensor block is turned away from the roller block.

BRIEF DESCRIPTION OF THE DRAWINGS

FIG. 28 is a perspective view showing the use of a document tray attached to the apparatus for reading character and image data according to the present invention;

FIG. 29 is a partial perspective view showing the document tray in FIG. 28;

FIG. 33 is a perspective view showing the apparatus for reading character and image data in FIG. 32 switched to manual feed mode.

BEST MODE FOR CARRYING OUT THE INVENTION

First Embodiment

The first embodiment according to the present invention is explained using FIGS. 1–8.

Figure 1:
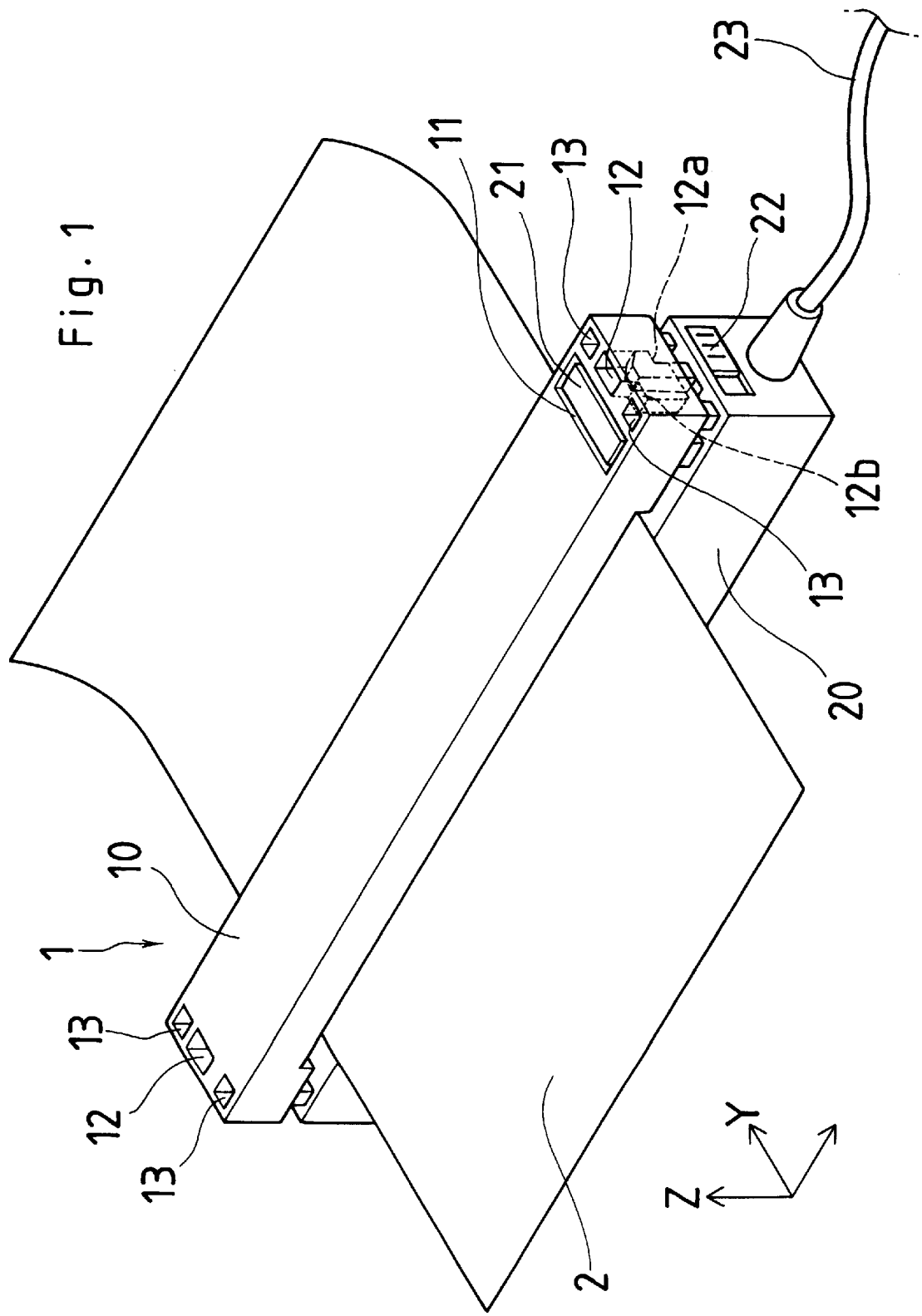
FIG. 1 is a perspective view showing a first embodiment of the reading apparatus according to the present invention used in the automatic feed mode.
Figure 2:
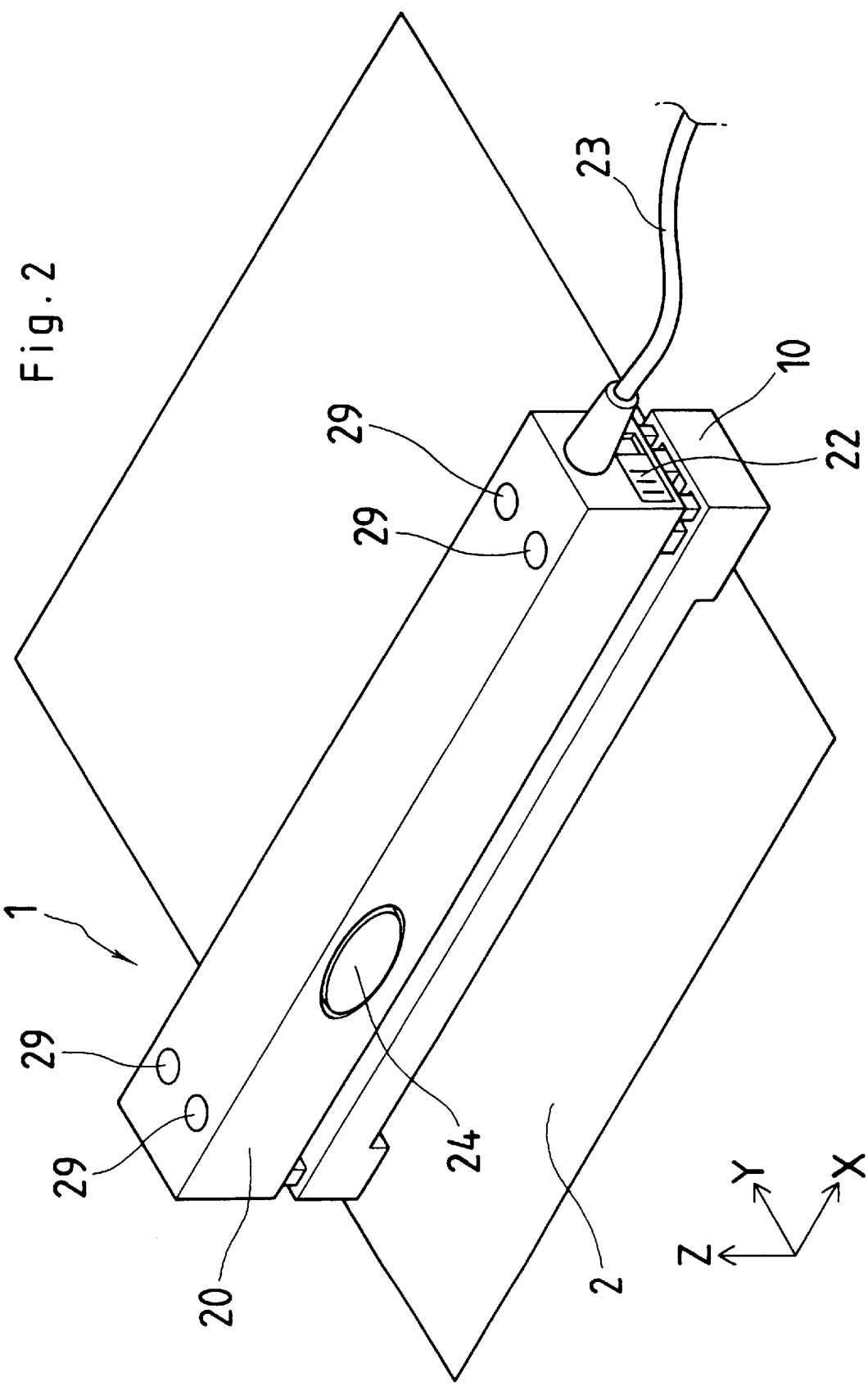
FIG. 2 is a perspective view showing the reading apparatus in FIG. 1 used in manual feed mode.

The general outline of this embodiment is explained using FIGS. 1 and 2.

The apparatus for reading character and image data 1 according to this embodiment comprises a sensor block 10 with a built-in character and image data reading sensor (not shown) for reading the contents of a document 2 whereon text, graphics, or the like are inscribed, and a roller block 20 with a driving roller 28 (FIG. 3) for automatically feeding the document 2.

In FIG. 1, a long, thin sensor block 10 is placed right above a long, thin roller block 20, and the both are coupled to each other. The reading sensor of the sensor block 10 and the driving roller of the roller block 20 are arranged opposite to each other. Here, the roller block 20 lies on the XY plane while the lengthwise direction of the roller block 20 corresponds to the direction of the X-axis. When the document 2 is inserted between the sensor block 10 and roller block 20, the document is fed automatically in the direction of Y-axis by the driving roller built in the roller block 20. During this process, the reading sensor built in the sensor block 10 reads text and images of the document 2. Hereinafter, "automatic feed mode" refers to the mode wherein text and images inscribed on the document 2 are read with the reading sensor while the document 2 is automatically fed by the driving roller.

The sensor block 10 in FIG. 1 is raised from the roller block 20 (in the direction of the Z-axis perpendicular to the X- and Y-axes) and separated from the roller block 20; then, the sensor block 10 is rotated 180° around the X-axis and connected to the roller block 20 once more. When this is done, the reading sensor of the sensor block 10 connected to the roller block 20 faces away from the roller block 20. As shown in FIG. 2, the sensor block 10 and roller block 20 form a connected body wherein the roller block 20 comes above while the sensor block 10 comes below to be in contact with the document. The apparatus is moved manually in the direction of the Y-axis over the document 2 placed on the XY plane and the reading sensor of the sensor block 10 reads the text and images inscribed on the document 2. Hereinafter, "manual feed mode" refers to the mode wherein the connected body of the sensor block 10 and roller block 20 is manually made to scan the document to read text and images on the document.

Incidentally, the specific structure for making connection and disconnection between the sensor block 10 and roller block 20 will be described later. In FIG. 2, reference numeral 29 denotes rubber feet attached to the roller block 20 to make easier insertion of the document 2 by preventing the roller block 20 from sliding during the automatic feed mode in FIG. 1.

Next, the internal structure of the apparatus for reading character and image data 1 is explained in detail with reference to FIG. 3.

Figure 3:
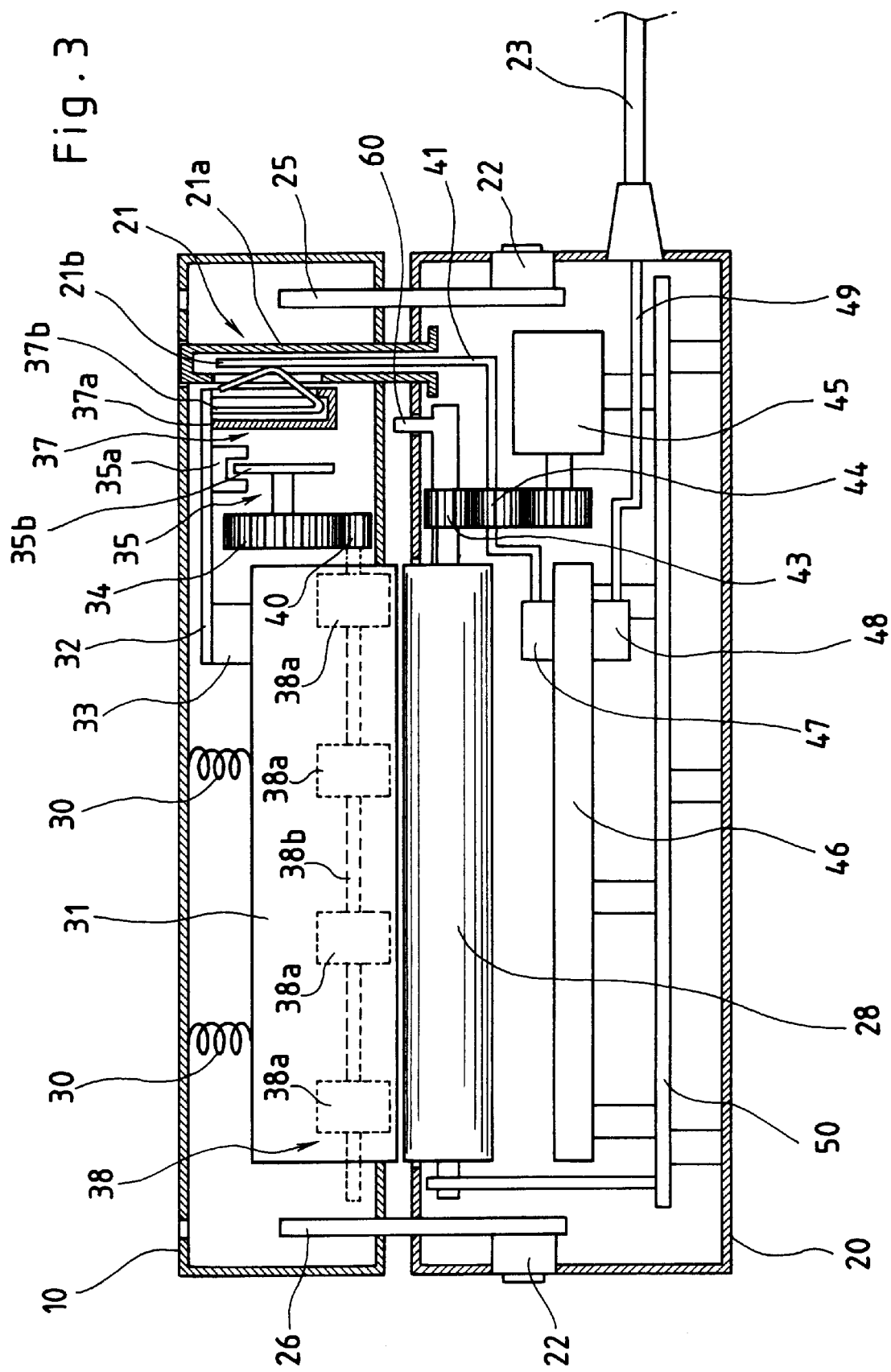
FIG. 3 is a cross sectional view schematically showing the internal structure of the reading apparatus in FIG. 1.

FIG. 3 shows the sensor block 10 and roller block 20 connected in automatic feed mode, as in FIG. 1. The sensor block 10 comprises a sensor unit 31, guide roller 38, rotary encoder 35, and female connector 37. Meanwhile, the roller block 20 comprises a driving roller 28 for automatically feeding the document, a motor 45 for driving the driving roller 28, a circuit board 46 provided with various control circuits and the like, a paper sensor 60 for detecting whether a document has been inserted, a male connector 21 for connecting with the female connector 37 of the sensor block, and an iron chassis 50 for supporting these components.

The sensor unit 31 comprises a light source constituted of a plurality of LEDs (not shown) and a line-shaped reading sensor (not shown) for reading the light reflected by the document. In the automatic feed mode, the reading surface of the reading sensor is placed opposite to the roller block 20 as shown in FIG. 3. Also, the sensor unit 31 is continually pressed against the roller block 20 with a pair of coil springs 30. Therefore, in automatic feed mode, the document is pressed continually by the sensor unit 31 against the driving roller 28. As a result, the document is securely transported with the driving roller 28. In the manual feed mode as shown in FIG. 2 as well, the elasticity of the coil springs 30 keeps the reading surface of the sensor unit 31 close to the document 2. Furthermore, these coil springs 30 have a pop-up function when the sensor block 10 is removed from the roller block 20 in the automatic feed mode (FIG. 1, FIG. 3).

The guide roller 38 comprises a plurality of rollers 38a, which are connected to a shaft 38b, and is used for detecting the scanning speed of the reading apparatus relative to the document 2 in manual feed mode (FIG. 2). When using in manual feed mode, the reading surface of the sensor unit 31 is pressed against the document to be read while manually moving the apparatus. In this process, the roller 38a also rotates in contact with the document. Further, in this process, the rotation speed of the roller is detected with a rotary encoder 35 and controlled so that variations in scanning speed will not cause the distortion of the image data read. The rotary encoder 35 comprises a photo interrupter 35a and fin 35b. The fin 35b is rotated by the gears 34 and 40 along with the rotation of the shaft 38b.

The circuit board 46 in the roller block 20 includes various control circuits for electrically controlling the apparatus for reading character and image data 1. A connector 47 is installed on the circuit board 46 and used for connecting with a flexible printed circuit(FPC) 41. The FPC 41 sends power and signals, from the circuit board 46, to the sensor block 10 and receives signals from the sensor block 10. The power for the reading apparatus is sent to the circuit board 46 from outside the system by means of cables 23, 49, and a connector 48. The motor 45 drives the driving roller 28 by means of gears 43, 44.

The slide button 22 and hook 25 installed on both sides of the roller block 20 are used for establishing and releasing a mechanical connection of the roller block 20 to the sensor block 10. The structure of these is described in detail below with reference to FIG. 4.

The female connector 37 on the sensor block 10 and the male connector 21 on the roller block form an electrical connection between the sensor block 10 and the roller block 20. The female connector 37 comprises a housing 37a formed of a plastic material and a spring-shaped terminal 37b housed therein. The terminal 37b is connected to the sensor unit 31 by means of an FPC 32 and connector 33.

The connector 21 comprises a housing 21a formed of a plastic material and a terminal 21b. The terminal 21b is formed of the FPC 41, which is housed as it is within the housing 21a. The FPC 41 contributes to cost reduction for the apparatus 1 by serving also as connection terminal 21b. Further, the terminals 37b and 21b of the connectors 37 and 21 respectively can be aligned in the document feed direction to reduce the size of the apparatus 1.

As in FIG. 3 (automatic feed mode), the male connector 21 on the roller block 20 is inserted from below (in other words, from the reading surface of the sensor unit 31) into the housing 37a. During manual feed mode, however, the male connector 21 is inserted into the housing 37a from the side opposite to the reading surface of the sensor unit 31.

The paper sensor 60 in the roller block plays the roles of a paper-in sensor for recognizing insertion of a document, a paper-end sensor for recognizing discharge of a document, and a jam sensor for recognizing erroneous feed, such as diagonal feed, of the document, instead of feeding straight with respect to the paper feed direction, during automatic feed mode. This paper sensor 60 is explained in detail later with reference to FIG. 5.

Figure 4:
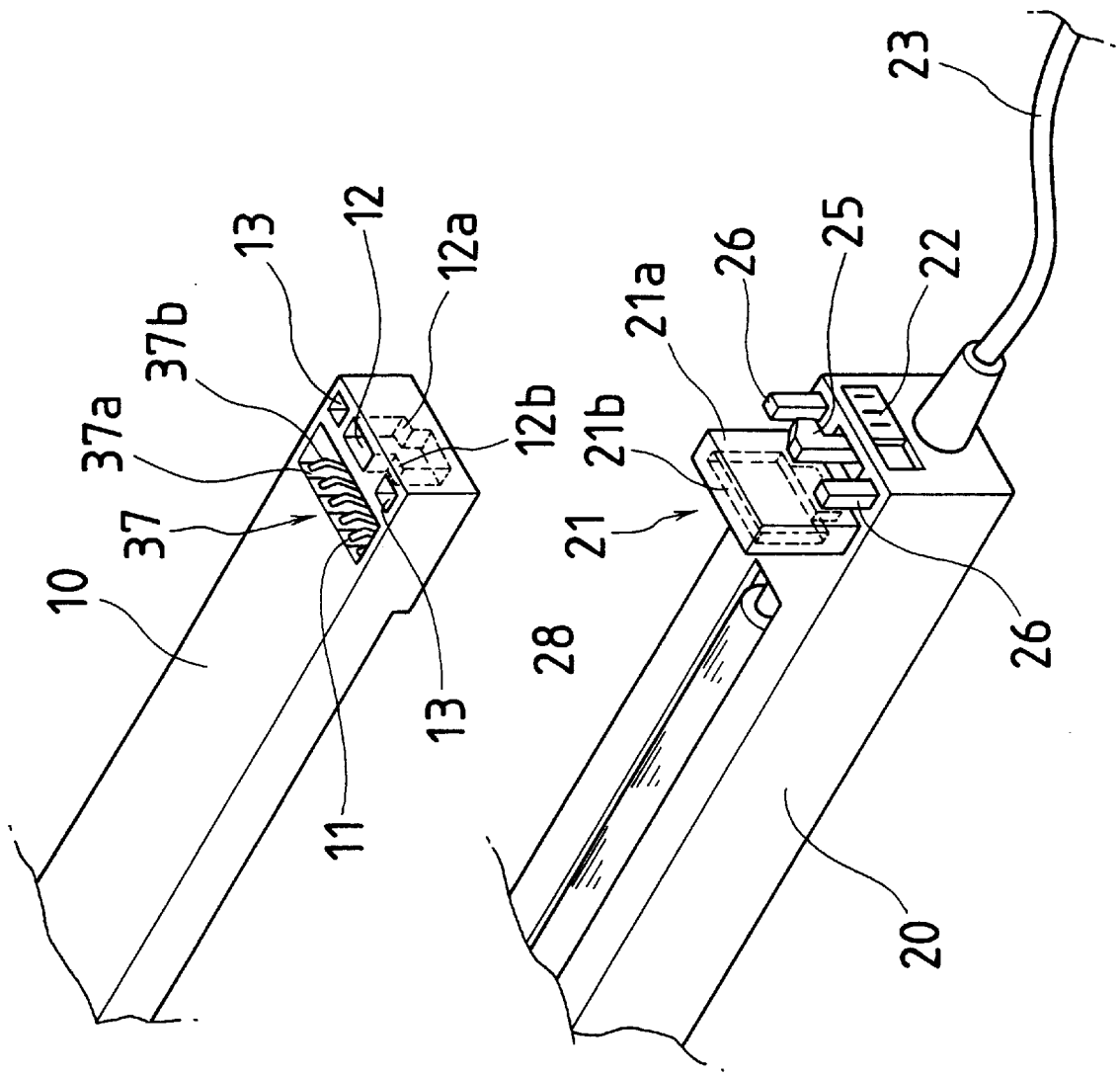
FIG. 4 is a perspective view showing the principal elements of the connector in the reading apparatus of the first embodiment.

Next, the structure of the mechanical connection between the sensor block 10 and the roller block 20 is explained in detail with reference to FIG. 4.

For making a mechanical connection between the sensor block 10 and the roller block 20, one hook 25 and two guide pins 26 protrude upwards from both ends of the roller block 20. A hook anchor hole 12 and guide holes 13, for receiving the hooks 25 and guide pins 26, are formed on the sensor block 10 at corresponding positions. When the sensor block 10 is brought near the roller block 20 in that state as shown in FIG. 4, the hooks 25 and guide pins 26 on the roller block 20 can be engaged with the hook anchor holes 12 and guide holes 13 of the sensor block 10 (in automatic feed mode). Also, even when the sensor block 10 in the state shown in FIG. 4 is turned upside down and brought near the roller block 20, the hooks 25 and guide pins 26 on the roller block 20 can be engaged with the hook anchor holes 12 and guide holes 13 of the sensor block 10 (in manual feed mode). Moreover, a first hook catching portion 12a and a second hook catching portion 12b are established in the hook anchor hole 12. In automatic feed mode, the hook 25 is anchored by the first hook catching portion 12a; in manual feed mode, the hook 25 is anchored by the second hook catching portion 12b. The linkage of the hook 25 with the hook catching portion 12a or 12b can be released by sliding the side button 22.

Figure 5:
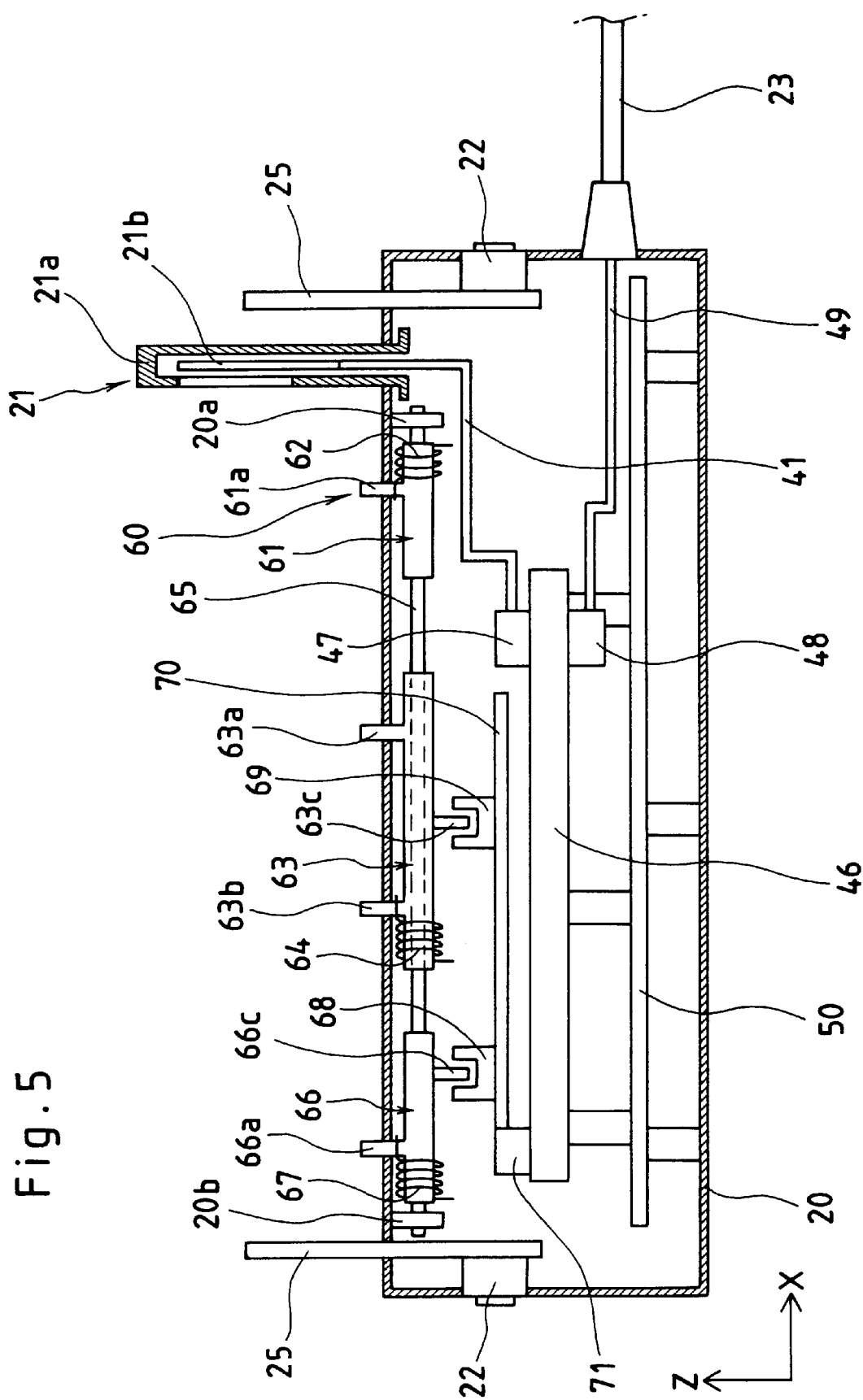
FIG. 5 is a cross sectional view showing the structure of the paper sensor in the roller block of the reading apparatus of the first embodiment.

Next, the paper sensor 60 is explained in detail with reference to FIG. 5.

The paper sensor 60 is provided for detecting the state of the document during automatic feed mode, and comprises a paper-in sensor 63, left jam sensor 66, and right jam sensor 61.

The paper-in sensor 63 is a sensor for detecting the insertion and discharge of documents, comprising detection levers 63a, 63b and a light interrupt lever 63c. The paper-in sensor 63 is installed in the housing of the roller block 20 swingably about the shaft 65. The light interrupt lever 63c makes switching of a photointerrupter 69 affixed on a board 70, which is electrically connected to the circuit board 46 by means of a connector 71. When a document is inserted, the detection levers 63a, 63b is forced to overturn by the thickness of the incoming document, causing the paper-in sensor 63 to rotate and the light interrupt lever 63c to turn on the photointerrupter 69. Then, when the document is discharged, the spring 64 makes the paper-in sensor 63 to restore its original state, and the photointerrupter 69 is turned off once more. The insertion and discharge of documents are detected in this way.

The left and right jam sensors 66 and 61 are sensors for detecting deviation of inserted document from the predetermined course. The left jam sensor 66 has the same structure as the aforementioned paper-in sensor 63 and comprises a detection lever 66a and light interrupt lever 66c. The right jam sensor 61 comprises only a detection lever 61a. These left and right jam sensors 66, 61 are affixed to the shaft 65. The shaft 65 is supported rotatably by bearings 20a, 20b installed on the roller block 20. Consequently, the left jam sensor 66 and right jam sensor 65 move together and are swingable independently of the paper-in sensor 63. For example, when the document deviates to the left from the predetermined course, causing the detection lever 66a of the left jam sensor 66 to fall, the light interrupt lever 66c turns on the photo-interrupter 68 installed on the board 70. When the document is removed, the spring 67 forces the jam sensor to return to its original state, and the photo-interrupter 68 turns off. Even when the document deviates to the right, the document causes the detection lever 61a of the right jam sensor 61 to fall, whereby the shaft 65 is rotated to swing, causing the left jam sensor 66 to turn on the photo-interrupter 68. When the document is removed, the spring 62 forces the jam sensor to restore its original state, and the photo-interrupter 68 is made to turn off again. In this simple way, document jamming can be detected.

Figure 6:
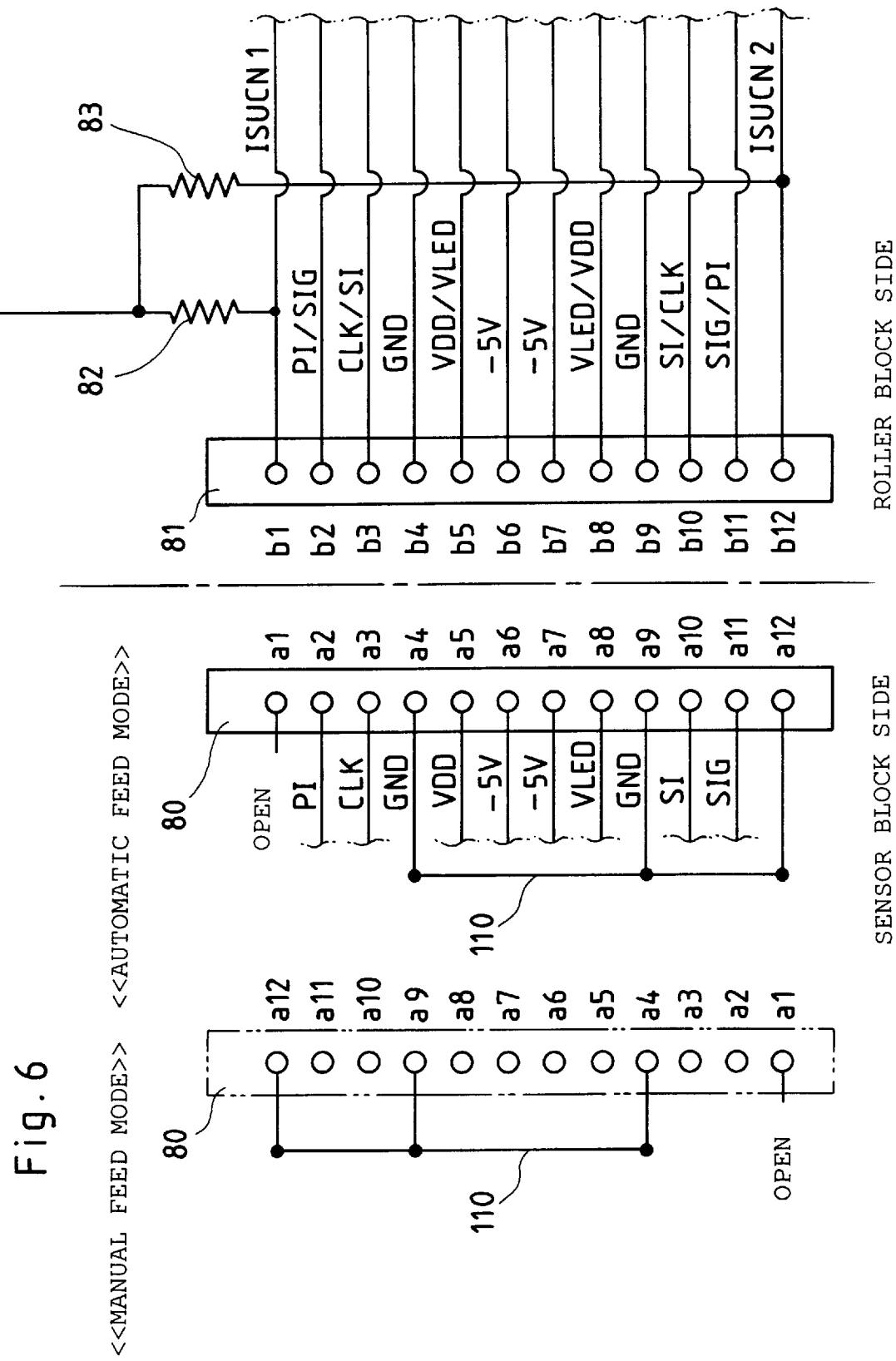
FIG. 6 is a diagram to explain the constitution of the transmission of electrical signals between the sensor block and roller block in the reading apparatus of the first embodiment.
Figure 7:
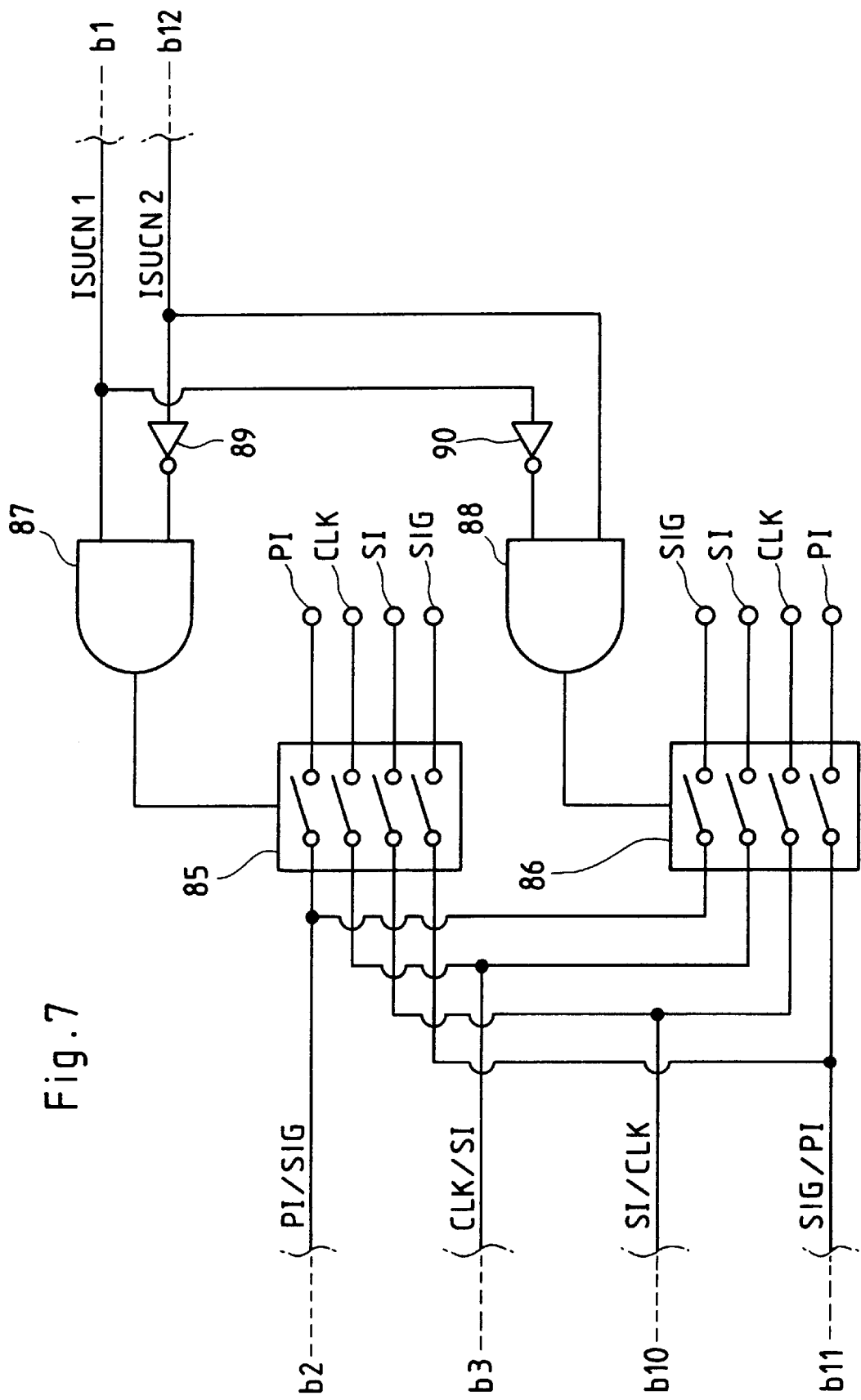
FIG. 7 is a diagram to explain the signals to be input to the connector side terminals b2, b3, b10, and b11 in FIG. 6.
Figure 8:
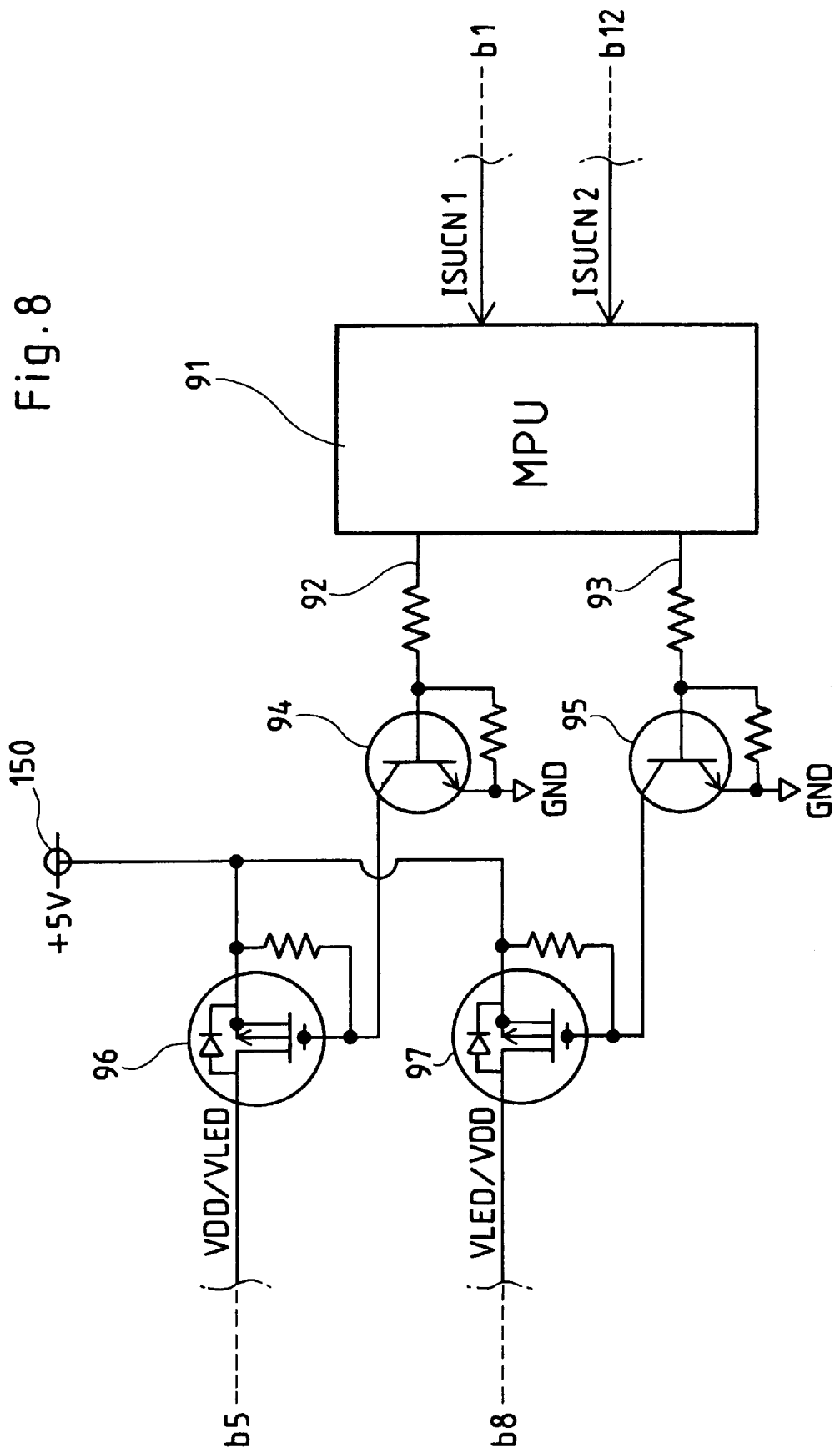
FIG. 8 is a diagram to explain the signals to be input to the connector side terminals b5, and b8 in FIG. 6.

Next, the constitution for sending and receiving electrical signals between the sensor block 10 and roller block 20 is explained in detail using FIGS. 6–8.

FIG. 6 shows signals to be sent and received between the connector on the side of the sensor block 10 and the connector on the side of the roller block 20.

Terminals a1, a2, a3, . . . a12 for electrically connecting with the corresponding connector are installed on the connector 80 on the side of the sensor block 10. Likewise, terminals b1, b2, b3, . . . b12 are installed on the connector 81 on the side of the roller block 20.

In automatic feed mode, the terminals a1, a2, a3, . . . a12 of the connector 80 on the side of the sensor block 10 are connected respectively to the corresponding terminals b1, b2, b3, . . . b12 of the connector 81 on the side of the roller block 20. However, as described previously, during manual feed mode, the other side of the sensor block 10 is connected to the roller block 20, so that, as shown in FIG. 6, the terminals a12, a11, a10, . . . a1 of the connector 80 on the sensor block are matched and connected respectively with the terminals b1, b2, b3, . . . b12 of the connector 81 on the roller block 20.

Here, the terminals a1, a2, a3, . . . a12 of the connector 80 on the sensor block 10 and the signals connected to each of the terminals will be explained.

The terminal a1 is an open terminal to which nothing is connected. The output signal (PI signal) of the rotary encoder 35 for monitoring the document feed speed in the sensor block 10 is connected to terminal a2. This PI signal is sent from the sensor block 10 to the roller block 20. A clock signal (CLK signal) for timing document reading or the like is connected to terminal a3. This CLK signal is sent from the roller block 20 to the sensor block 10. A ground signal (GND) is connected to the terminal a4. A power supply (VDD power) for the line sensor provided in the sensor unit is connected to terminal a5. This VDD power is supplied from the roller block 20 to the sensor block 10. −5 V power source used by the amplifier is connected to the terminals a6, a7. A power supply (VLED power) to the LEDs, being the light source provided in the sensor unit, is connected to the terminal a8. This VLED power is supplied from the roller block 20 to the sensor block 10. A GND signal is connected to the terminal a9. A trigger signal (SI signal) for commanding the start of data reading is connected to the terminal a10. This SI signal is sent from the roller block 20 to the sensor block 10. An output signal (SIG signal) for the line sensor provided in the sensor unit is connected to the terminal a11. This SIG signal is sent from the sensor block 10 to the roller block 20. The terminal a12 is connected to terminals a4 and a9 by way of the GND line 110.

Next, the terminals b1, b2, b3, . . . b12 of the connector 81 on the roller block 20 will be explained.

The PI signal and SIG signal are selectively connected to terminals b2 and b11. The CLK signal and SI signal are selectively connected to terminals b2 and b10. The VDD power and VLED power are selectively connected to terminals b5 and b8. The terminals b4 and b9 are connected to ground (GND). The terminals b6 and b7 are connected to −5 V power source.

The terminals b1 and b12 are connected to +5 V power source 84 through pull amp resistors 82 and 83 respectively. The ISUCN1 signal is input to the terminal b1, and the ISUCN2 signal is input to the terminal b2. The state of the voltage of these terminals is detected as a logical value signal and is used when switching the signals to be connected to each of the terminals b2, b3, b5, b8, b10, b11, as discussed below.

Table 1 shows the state of the logical values of the ISUCN1 signal and ISUCN2 signal in automatic feed mode, manual feed mode, and open mode where the connector 80 and connector 81 are not connected.

TABLE 1

|  | ISUCN1 | ISUCN2 |
| --- | --- | --- |
| Automatic feed mode | HIGH | LOW |
| Manual feed inode | LOW | HJGH |
| Open mode | HIGH | HIGH |

As shown in FIG. 6, when connectors 80 and 81 are connected in automatic feed mode, the terminal b1 is connected to the terminal a1, which is an open terminal, and, as a result, the level of ISUCN1 becomes equal to +5 V of the level of power 84, and the state of the logical value becomes HIGH. On the other hand, the terminal b12 is connected to the terminal a12, but because terminals b4 and b9 are connected to the ground through a4 and a9 which are shared terminals, so that the logical value of ISUCN2 becomes LOW. Meanwhile, when the connectors 80 and 81 are connected in manual feed mode, a relationship exactly opposite to the aforementioned explanation is established, causing the state of the logical value ISUCN1 to become LOW and the state of the logical value ISUCN2 to become HIGH. In open mode wherein the connectors 80 and 81 are not connected, the terminals b1 and b12 are open, that is, in high impedance, and the states of the logical values of both ISUCN1 and ISUCN2 become HIGH.

Next, the switching of the aforementioned terminals using the ISUCN1 signal and ISUCN2 signal is explained. The switching of terminals b2, b3, b10, and b11 is explained first and the remaining terminals b5 and b7 are explained later.

FIG. 7 shows the switching circuit installed in the roller block 20; it is constituted so that terminals b2, b3, b10, b11 are connected to the PI, CLK, SI, and SIG signals respectively in automatic feed mode, and are switched to SIG, SI, CLK and PI signals respectively in manual feed mode.

In FIG. 7, reference numerals 85 and 86 denote 4-channel analog switching circuits, reference numerals 87 and 88 denote AND circuits, and reference numerals 89 and 90 denote inverter circuits. Terminals b2, b3, b10, b11 are connected to the analog switching circuits 85 and 86 on one side and to the control circuit board (not shown), installed on the roller block 20, on the other side. The outputs of the AND circuits 87 and 88 are input to the analog switching circuits 85 and 86 respectively, the circuits being designed so that when the state of the input logical values is HIGH, the switch is turned on, and when the state is LOW, the switch is turned off.

When the connectors 80 and 81 are connected in automatic feed mode, the state of the logical value of the ISUCN1 signal becomes HIGH and that of the ISUCN2 signal becomes low, as shown in Table 1above. Consequently, the state of the logical value of the output of the AND circuit 87 becomes HIGH, and that of the AND circuit 88 becomes LOW; therefore, the switching circuit 85 turns ON, and the switch 86 turns OFF. As a result, the PI, CLK, SI, and SIG signals are connected to terminals b2, b3, b10, b11 respectively in the automatic feed mode.

Meanwhile, when the connectors 80 and 81 are connected in manual feed mode, the state of the logical value of the ISUCN1 signal becomes LOW and that of the ISUCN2 becomes HIGH. Consequently, the state of the logical value of the output of the AND circuit 87 becomes LOW and that of the AND circuit 88 becomes HIGH; therefore, the switching circuit 85 turns OFF, and the switch 86 turns ON. As a result, the SIG, SI, CLK, and PI signals are connected to terminals b2, b3, b10, b11 respectively in the manual feed mode.

As above, the signals connected to the terminals b2, b3, b10 and b11 are PI, CLK, SI and SIG respectively in automatic feed mode, but, when switched to manual feed mode, SIG, SI, CLK and PI signals are input respectively. Moreover, when the connectors 80 and 81 are not connected (open mode), both the states of the logical values of ISUCN1 and ISUCN2 both become HIGH, and, therefore, both the outputs from the AND circuits 87 and 88 become LOW, while both the analogue switching circuits 85 and 86 become OFF. Consequently, the terminals b2, b3, b10 and b11 enter a high impedance state and safety is assured.

Next, the signals connected to terminals b5 and b8 of the connector 81 are explained with reference to FIG. 8.

In FIG. 8, reference numeral 91 denotes a microprocessor (MPU), which controls switching of power source according to the information in the ISUCN1 and ISUCN2 signals input. The signal line 92 from the MPU 91 is for sending power to the terminal b5 of the connector 81; the signal line 93 from the MPU 91 is for sending power to the terminal b8 of the connector 81. Reference numerals 94 and 95 denote NPN-type transistors; reference numerals 96 and 97 denote field effect transistors (FET).

When the apparatus is used in automatic feed mode, the ISUCN1 is input to MPU 91 in a HIGH state and ISUCN2 is input in a LOW state (See Table 1). Then, the signal line 92 then becomes a signal line for supplying power to the line sensor, and a HIGH signal is output. This HIGH signal is converted into a LOW signal by the transistor 94; the FET 96 enters an ON state; and line sensor power is supplied to the terminal b5 of the connector 81. Meanwhile, the signal line 93 becomes a signal line for supplying power to the LED, and a HIGH signal is output. This HIGH signal is converted into a LOW signal by the transistor 95; the FET 97 enters an ON state; and the LED power is supplied to the terminal b8 of the connector 81.

Next, when the apparatus is switched to manual feed mode, the ISUCN1 signal is input to the MPU91 in a LOW state, and the ISUCN2 is input in a HIGH state (See Table 1). Then, the signal line 92 becomes a signal line for supplying power to the LED, and a HIGH signal is output. Then, this HIGH signal is converted into a LOW signal by the transistor 94; the FET 96 enters an ON state; and LED power is supplied to the terminal b5 of the connector 81. The signal line 93 becomes the signal line for supplying power to the line sensor, and a HIGH signal is output. This HIGH signal is converted into a LOW signal by the transistor 95; the FET 97 enters an ON state; and the line sensor power is supplied to the terminal b8 of the connector 81.

In the state where the sensor block 10 and roller block 20 are completely separated, and the connector 80 and connector 81 are disconnected (open mode), a LOW signal is output to both the signal lines 92, 93; FET 96, 97 become OFF; and power is not supplied to the terminals b5, b8.

The apparatus for reading character and image data according to this embodiment has the following effects.

The apparatus is designed so that it will not require a large projection area on the document surface when used in manual feed mode, and thus an operator can hold it easily with a hand, thereby making it easier to handle it. Thus, the apparatus requires only a small space for reading a document, so that it has superior portability.

Furthermore, the electrical connection between the roller block and the sensor block can surely be effected with connectors having a special structure. As a result, the apparatus can be made highly reliable, because signal transmission can be made correctly even when the apparatus is switched from the automatic feed mode to the manual feed mode.

Second Embodiment Next, the second embodiment according to the present invention is explained with reference to FIGS. 9–14.

Figure 9:
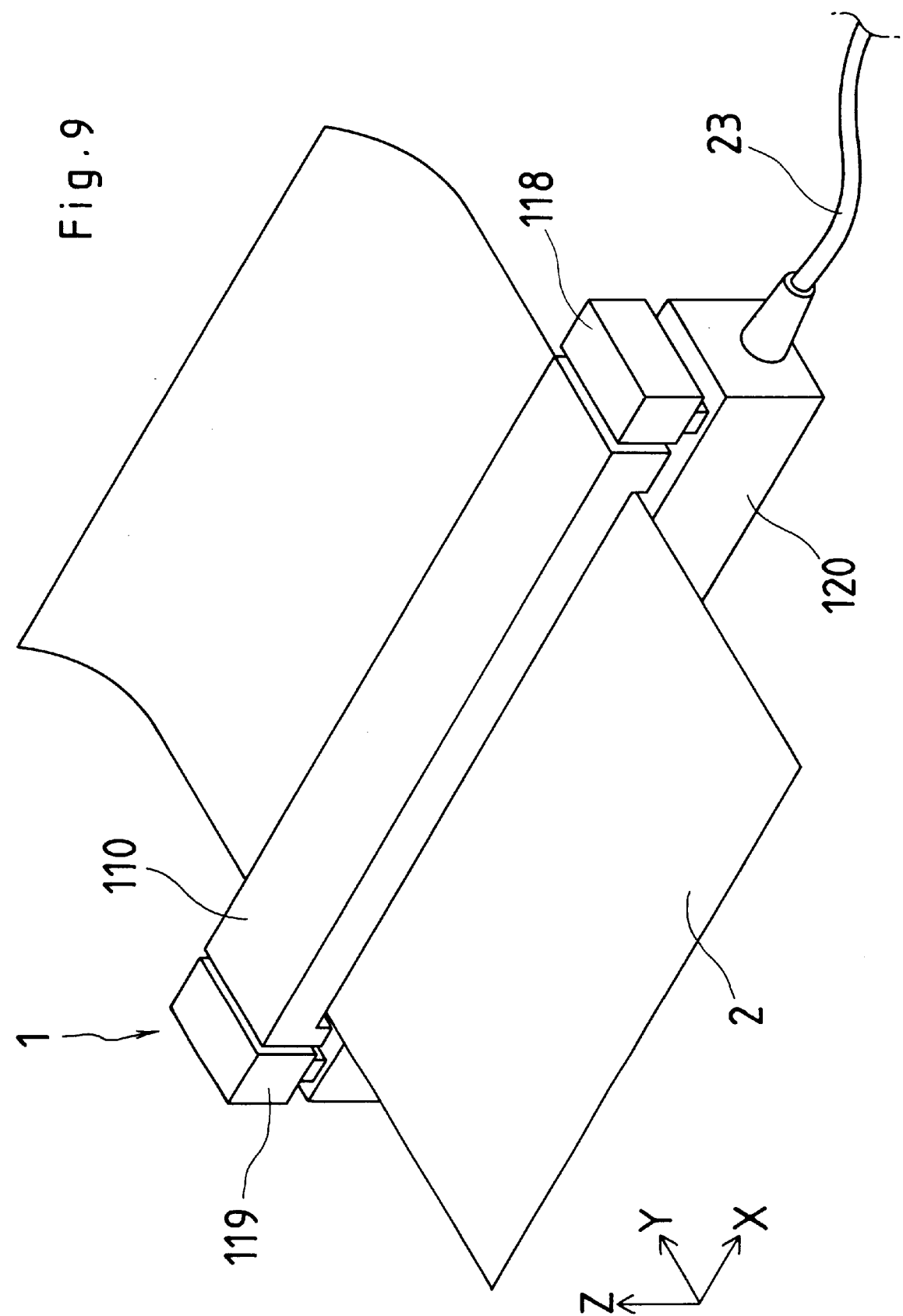
FIG. 9 is a perspective view showing a second embodiment of the reading apparatus according to the present invention used in the automatic feed mode.
Figure 10:
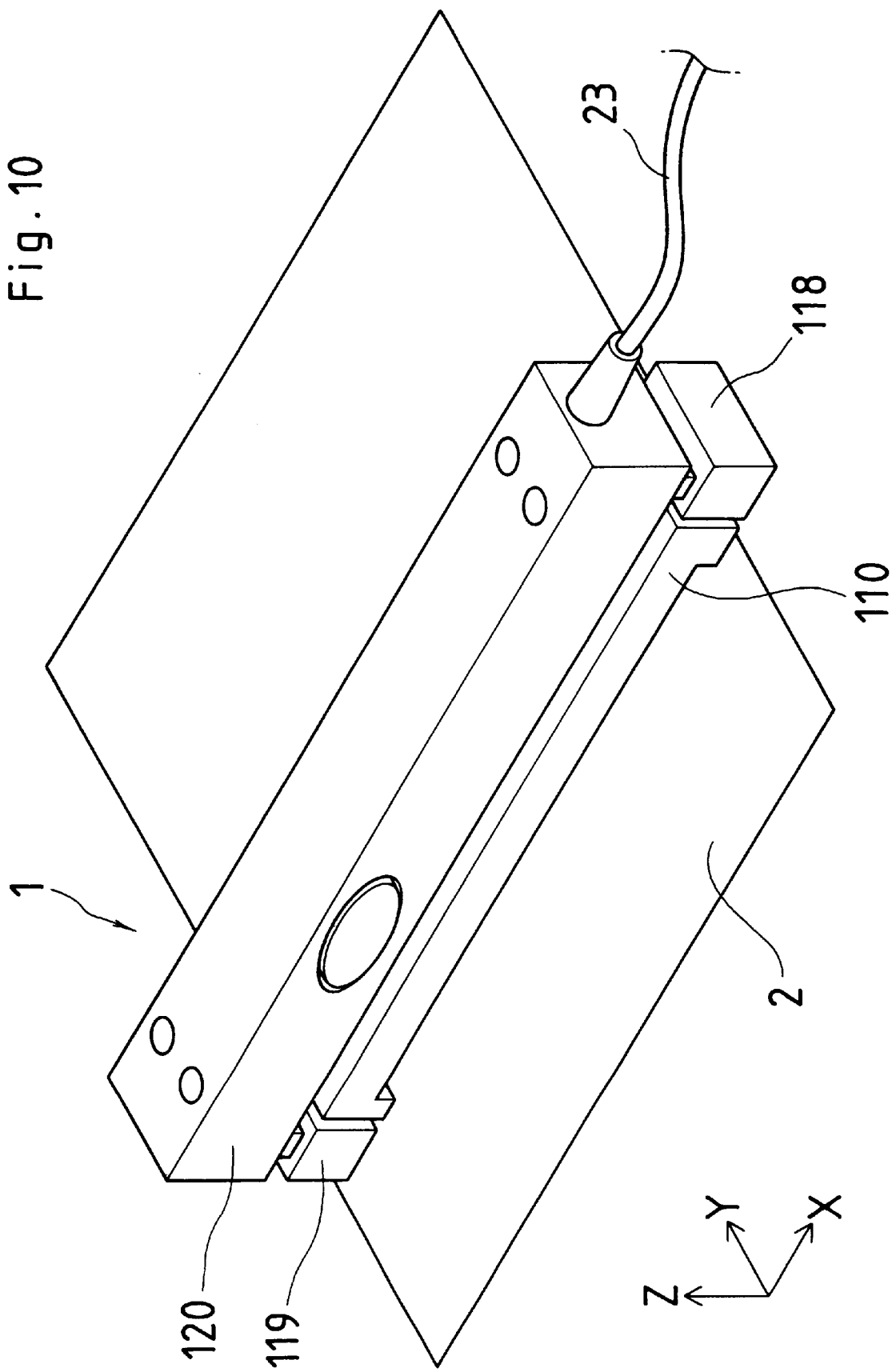
FIG. 10 is a perspective view showing the reading apparatus in FIG. 9 used in the manual feed mode.
Figure 11:
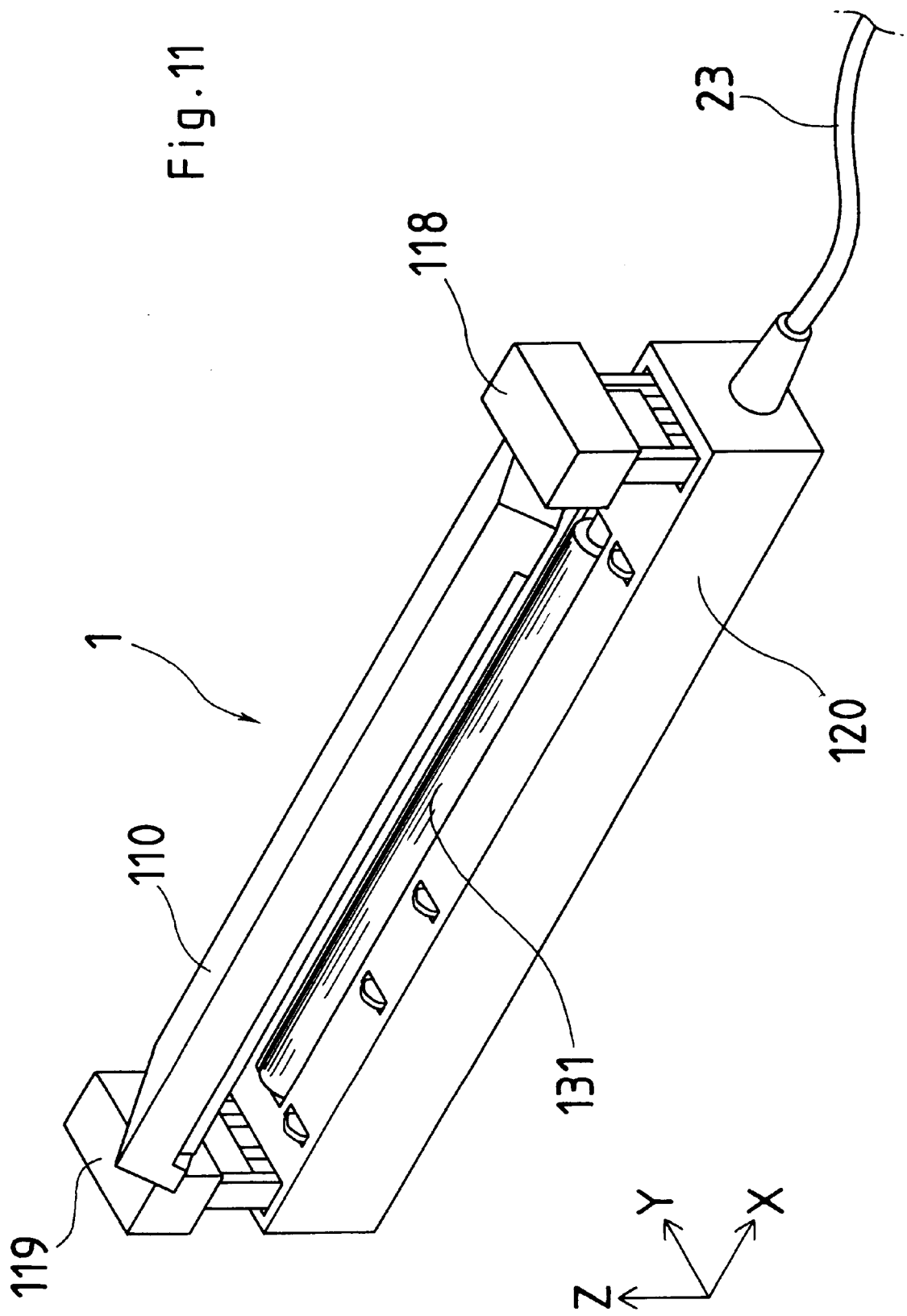
FIG. 11 is a perspective view showing the process of switching from the automatic feed mode in FIG. 9 to the manual feed mode in FIG. 10.

First, the outline of this embodiment is explained using FIGS. 9, 10, and 11.

In the apparatus for reading character and image data according to this embodiment, a first rotary support member 118 and a second rotary support member 119 are mounted slidably respectively in the direction of the Z axis, which is perpendicular to the XY plane, on both ends of the roller block 120 on the XY plane. Whereby the rotary support members 119 can selectively assume one position where it is being far from the roller block 120 (FIG. 11) and the other position where it is being close to the roller block 120 (FIG. 9). Between these rotary support members 118 and 119, the sensor block 110 is installed rotatably around the lengthwise axis.

The state in FIG. 9 shows the state where the apparatus is used in the automatic feed mode, wherein the reading surface of the reading sensor (not shown) of the sensor block 110 faces the driving roller 28 (See FIG. 11) of the roller block 120. When the first and second rotary support members 118, 119 in FIG. 9 are raised in the direction of the Z axis (FIG. 11) and the sensor block 110 is rotated 180° around its axis parallel to the X-axis, then, the surface of the sensor block 110, which has faced heretofore the driving roller in the automatic feed mode in FIG. 9 comes to be turned away from the driving roller, being in manual feed mode. In other words, in manual feed mode, as the reading surface of the reading sensor of the sensor block 110 is put away from the roller block, the sensor block 110, arranged beneath the roller block 120 as shown in FIG. 10, can scan manually text and images on the document 2 to read with the reading sensor of the sensor block 110.

Next, the internal structure of the apparatus for reading character and image data 1 is explained in detail with reference to FIG. 12.

Figure 12:
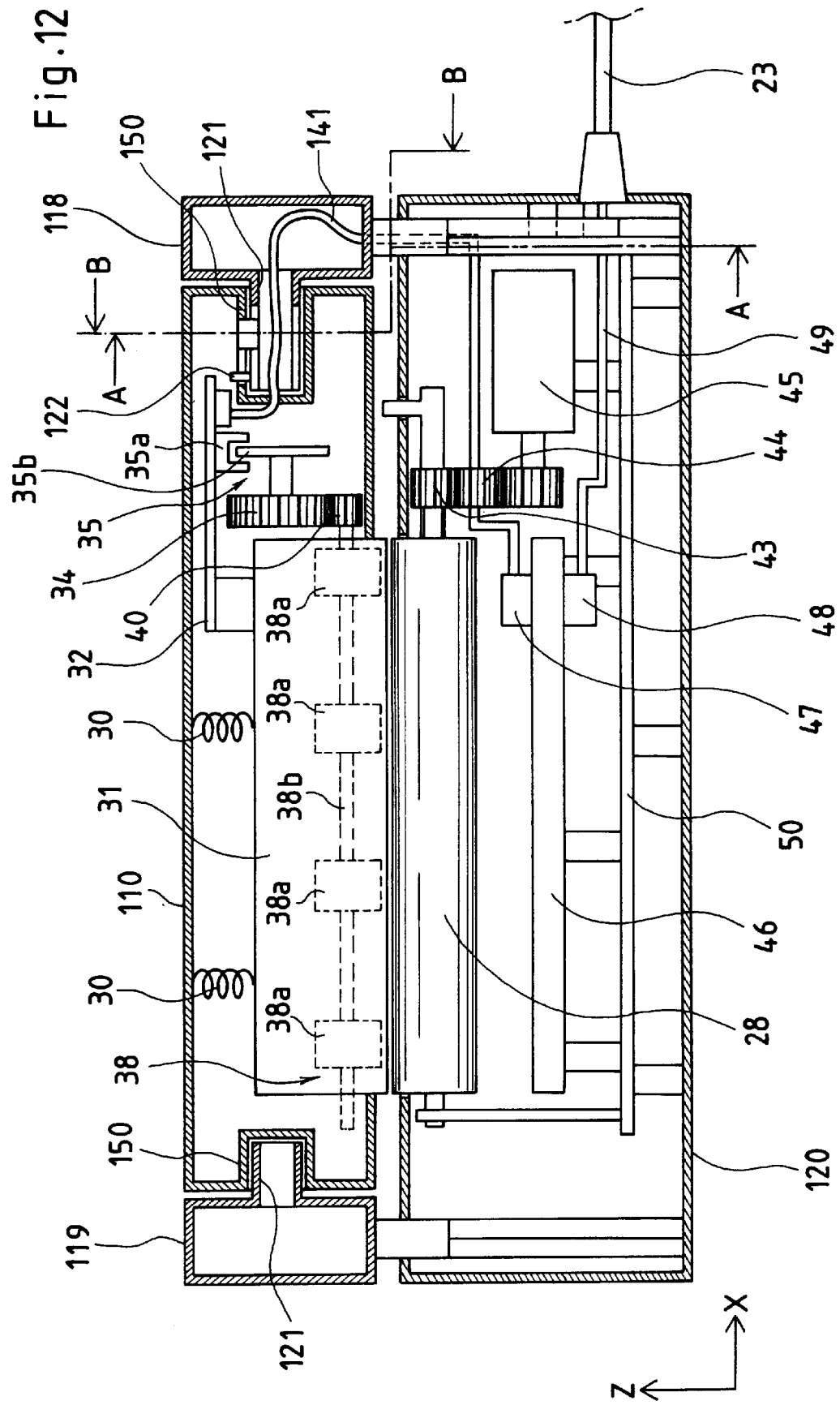
FIG. 12 is a cross sectional view schematically showing the internal structure of the reading apparatus in FIG. 9.

FIG. 12 shows the state where the sensor block 110 and roller block 120 are connected in automatic feed mode as in FIG. 9. The same reference numerals as used for the components of the first embodiment shown in FIG. 3 are also applied to those elements in FIG. 12 on condition that those components have the same functions. Explanation of components in common with the first embodiment are omitted and only those different from the first embodiment are explained below.

Both the first rotary support member 118 and second rotary support member 119 are respectively provided with a boss portion 121 protruding therefrom in the direction of the X axis, while boss receiving portions 150, for receiving the boss portion 121, are formed on both the right and left ends of the sensor block 110. With the boss portions 121 of the first and second rotary support members 118, 119 inserted into the boss receiving portions 150 on the sensor block 110, the sensor block 110 is supported rotatably around the axis of the boss portions 121. FIG. 12 shows the state where the apparatus is in automatic feed mode, wherein the reading surface of the reading sensor unit 12 of the sensor block 110 is disposed opposite to the driving roller 28 of the roller block 120. When the sensor block 110 is rotated 180° around the axis of the boss portions 121, the apparatus is switched to the manual feed mode; a detailed explanation thereof will follow.

The signals and power from the circuit board 46 on the roller block 120 are sent to the sensor block 110 through the connector 47 and cable 141. This cable 141 passes through the first rotary support member 118 and the boss receiving portion 150 thereof and one end of the cable 141 is connected to the connector of the FPC 32 in the sensor block 110. As a result, the cable 141 is not greatly twisted when the rotary support member 118 is raised (in Z axis direction) and then the sensor block 110 is rotated with respect to the rotary support members 118, 119 (note that the sensor block 110 is constructed so that it does not rotate more than 180°, as described below).

Next, the rotary support members 118, 119 and related structures are discussed with reference to FIGS. 13 and 14.

Grooves (cut-out portions 121a, 121a) with specified length and width are formed along the axis (X-axis) at two circumferentially opposite locations on the boss portion 121 of the first rotary support member 118. The cut-out portion 121a comprises a perpendicular wall cut perpendicular to the boss portion 121 and an angled wall 121b cut at an angle to the boss portion 121, so that the outside width of the cut-out portion 121a is wider than the inside width.

Furthermore, both the rotary support members 118 and 119 are provided with two slide portions 124 and two flexible branches 132, each having a hook 123 on the front end thereof.

The roller block 120 has two flexible branches 130a, having hook catching portions 130b formed on the facing surfaces thereof, and a guide portion 130e formed on the inner side wall thereof.

The first hook catching portion 130c, which is closer to the bottom of the roller block 120, and the second hook catching portion 130d thereabove are formed on the hook catching portions 130b of the flexible branches 130a. The hooks 123 on the flexible branches 132 of the rotary support members 118, 119 catch on either the first or second catching portion 130c, 130d. Furthermore, the slide portion 124 of the rotary support members 118, 119 catches on the guide portion 130e of the roller block 120. In FIG. 13, the hook 123 is caught by the first catching portion 130c. However, when the first rotary member 118 is lifted (moved in the direction of arrow C in FIG. 13), the slide portion 124 is guided by the guide portion 130e, causing the flexible branches 132 to be bent, and the hooks 123 to be released from the first catching portions 130c to catch on the second catching portions 130d. When the movement of the first rotary support member 118 is stopped at this position, the first rotary support member 118 is situated at a position farther from the roller block 120 than that shown in FIG. 13.

Figure 14:
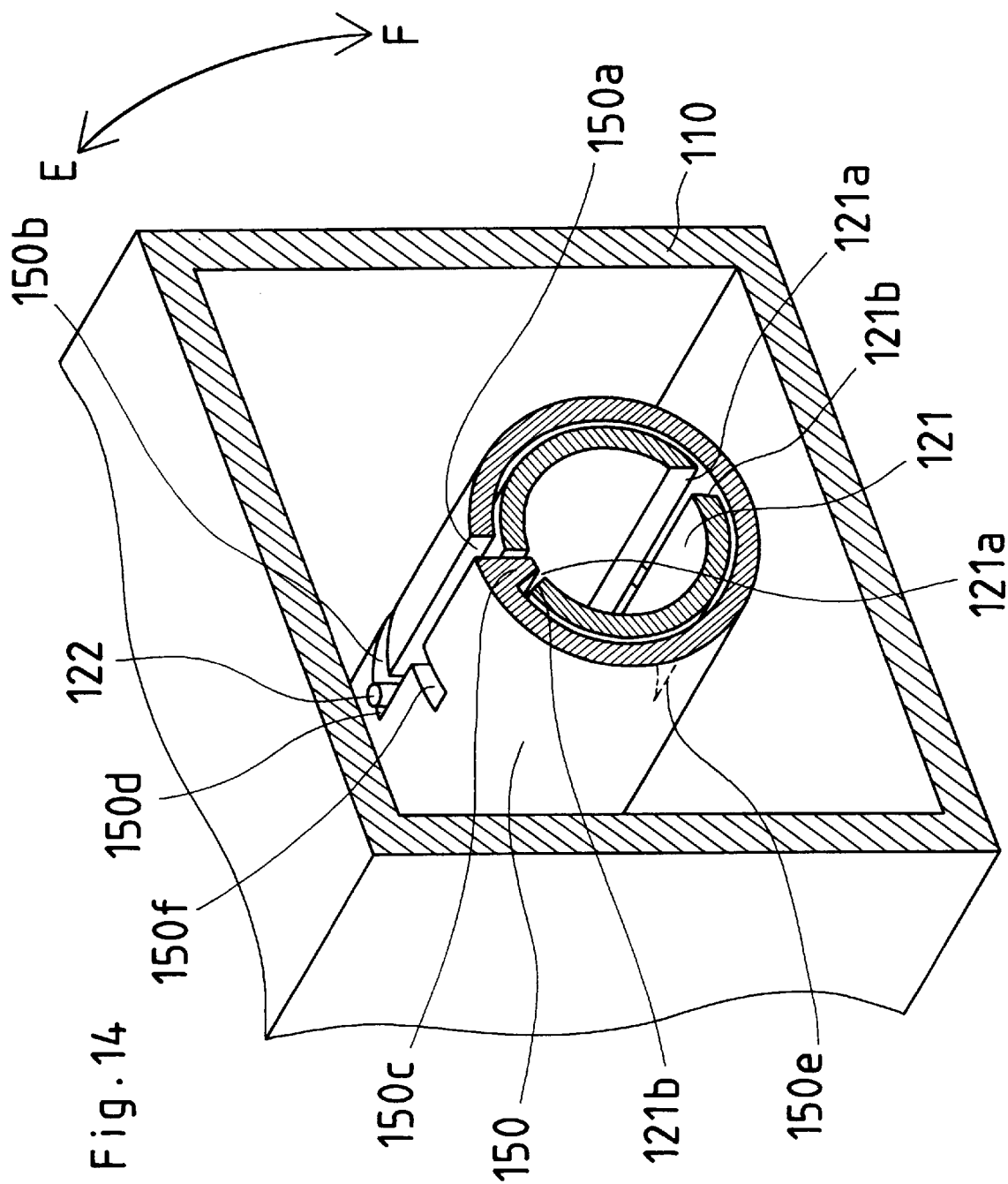
FIG. 14 is a cross sectional view of FIG. 12 at line B—B, showing the structure of the sensor block relating to the rotary support.

As shown in FIG. 14, the boss portion 121 of the rotary support member 118 has a stopper pin 122 on the outer edge thereof, while a cut-out portion 150a, extending for a predetermined length in the direction of the axis, and a stopper pin guide slot 150b, extending for a predetermined length (180° by angle) from the end of the cut-out portion 150a in the direction of the circumference of the boss receiving portion 150, are formed on the boss receiving portion 150. The cut-out portion 150a and stopper pin guide slot 150b are wide enough for the stopper pin 122 to freely pass therethrough. One end (end connected with the cut-out portion 150a) of the stopper pin guide slot, extending around the circumference of the boss receiving portion 150, becomes a first contact portion 150d, while the other end of the stopper pin guide slot 150b becomes a second contact portion 150e. In other words, in a state shown in FIG. 14, when the boss receiving portion 150 (or, the sensor block 110) is rotated counterclockwise with respect to the boss portion 121, the stopper guide slot 150b is guided by the stopper pin 122 all the way through 180° until the stopper pin 122 hits the second contact portion, and further rotation is prevented.

A hook portion 150c, having a form of a protrusion (hook) which can be inserted into the cut-out portion 121a of the boss portion 121, is formed on part of the side of the boss receiving portion 150, opposite to the side whereon the stopper pin guide slot 150b is formed with the cut-out portion 150a between. One side of this hook portion 150c defines one side of the stopper pin guide slot 150. Also, this hook portion 150c is divided by a slot 150f extending in the circumferential direction from the cut-out portion 150a, thereby allowing the boss receiving portion to easily undergo elastic deformation in a radial direction.

FIG. 14 is a cross sectional view taken at line B—B in FIG. 12 and shows the automatic feed mode state. In other words, the end protrusion of the hook portion 150c of the boss receiving portion 150 engages one cut-out portion 121a formed on the boss portion 121, and the stopper pin 122 contacts one end (end portion connected with cut-out portion 150a, first contact portion 150d) of the stopper pin guide slot 150b.

The procedure for switching from automatic feed mode to manual feed mode is explained below.

The sensor block 110, first rotary support member 118, and second rotary support member 119 are raised together in a direction away from the roller block 120 (in the direction of the arrow C in FIG. 13), so that the hooks 123 of the flexible branches 132 are caught by the second catching portion 130d. Then, the sensor block 110, together with the boss portion 121, is rotated in the direction of the arrow E in FIG. 14 around the central axis of the boss receiving portion 150. This causes the protruding end of the hook portion 150c of the boss receiving portion 150 to elastically deform outward in a radial direction to override the slanted wall 121b of the cut-out portion 121a of the boss portion 121, allowing the rotation to continue. During this process, the relative movement the stopper pin 122 and stopper pin guide slot 150b continues. When the sensor block 110 rotates 180° (or rotated reversely), the protruding end of the hook portion 150c of the boss receiving portion 150 engages with the other cut-out portion 121a of the boss portion 121. In this state, the stopper pin 122 contacts the other end (second contact portion 150e) of the stopper pin guide slot 150b.

Figure 13:
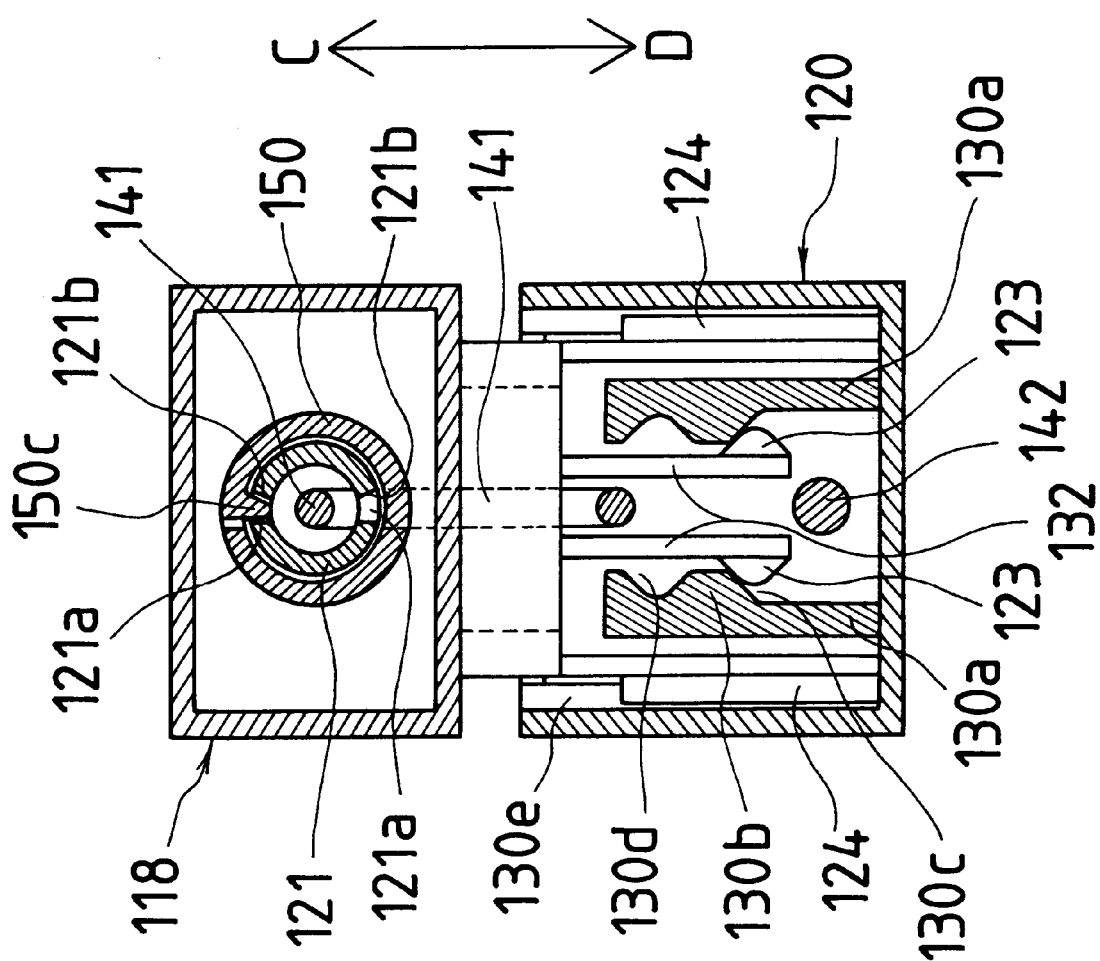
FIG. 13 is a cross sectional view of FIG. 12 at line A—A, schematically showing the structure of the rotary support member.

In this state, as shown in FIG. 13, when the sensor block 110 (and first and second rotary support members 118, 119) is pushed into the roller block 120 (in the direction of arrow D) in this state, the hook 123 is elastically deformed and is removed from the second catching portion 130d to be caught by the first catching portion 130c. That is, the manual feed mode, wherein the reading surface of the sensor unit 31 of the sensor block 110 is not facing the roller block 120, is established.

To switch from manual feed mode to automatic feed mode, the sensor block 110 is lifted away from the roller block 120, the sensor block 110 is rotated in a direction opposite to the direction indicated above (in the direction of arrow F in FIG. 14), and then the sensor block 110 is pushed into the roller block 120.

In the foregoing explanation, the boss portion 121 of only one of the two rotary support members 118, 119 (for example only the first rotary support member 118) is provided with a stopper pin 122 and the other (in other words, the second rotary support member 119) is not provided with the same (see FIG. 12). However, the boss portions of both the rotary support members 118 and 119 may be provided with stopper pins. Naturally, in such a case, the hook portion 150c and stopper pin guide slot 150b are formed equally for both of the receiving portions 150.

As explained above, the apparatus for reading character and image data according to the present embodiment can be switched from automatic feed mode to manual feed mode and back again by first lifting the sensor block 110 from the roller block 120 up to a predetermined position, then, turning around the sensor block 10, and simply pushing the turned-over sensor block 110 back into the roller block 120. Further, the mechanical connection of the sensor block 110 and roller block 120 is effected with a pair of cylindrical boss portions 21 and a pair of boss receiving portions 150 for supporting the boss portions 121, so that a special part such as a slide contact is not necessary, since the cable 141 from the roller block 120 to the sensor block 110 passes through the boss portion 121 and thus will not be twisted, even if the sensor block 110 is rotated with respect to the roller block 120.

Third Embodiment

Next, the third embodiment according to the present invention is explained using FIGS. 15–19.

Figure 15:
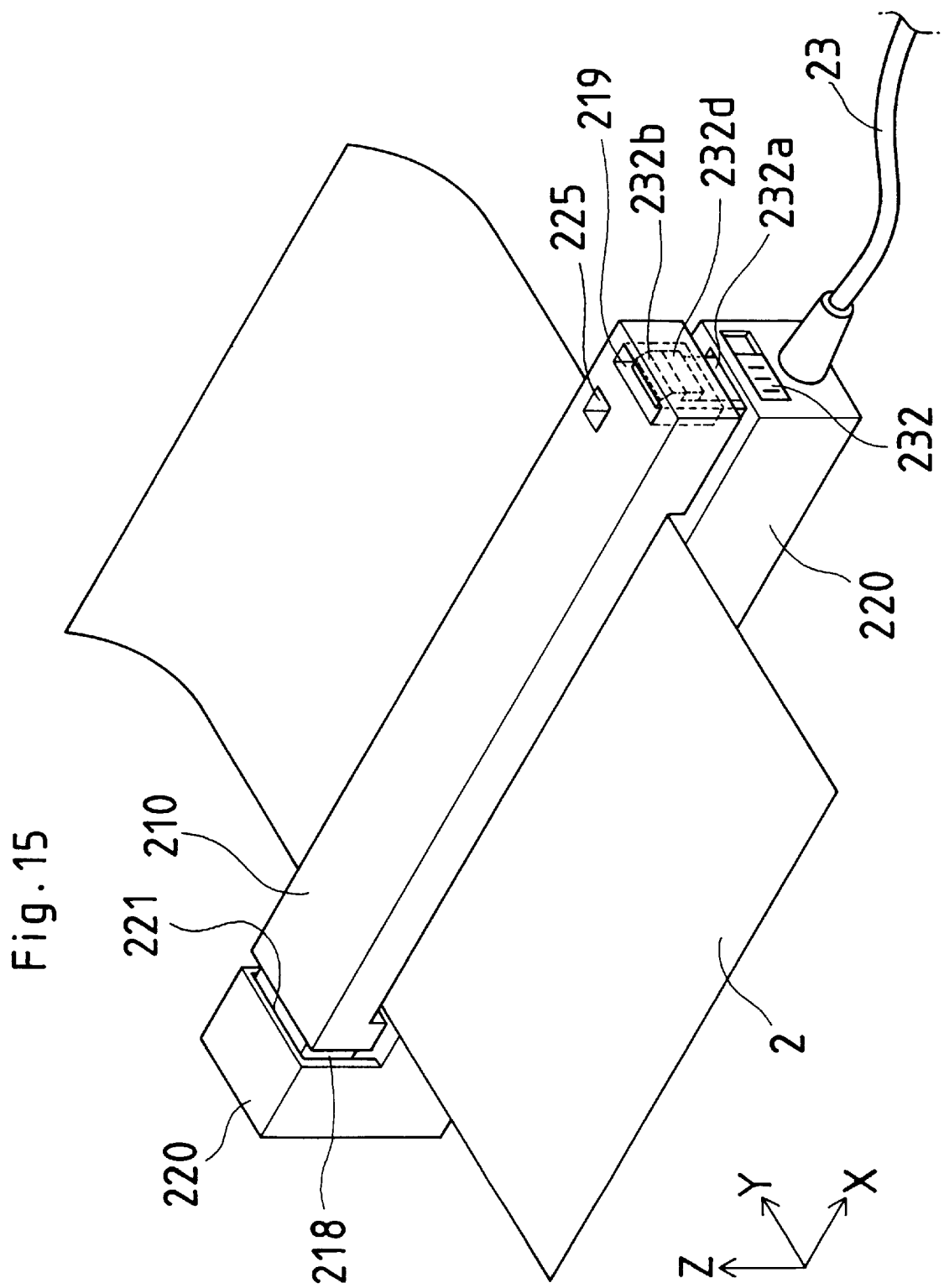
FIG. 15 is a perspective view showing a third embodiment of the reading apparatus according to the present invention used in the automatic feed mode.
Figure 16:
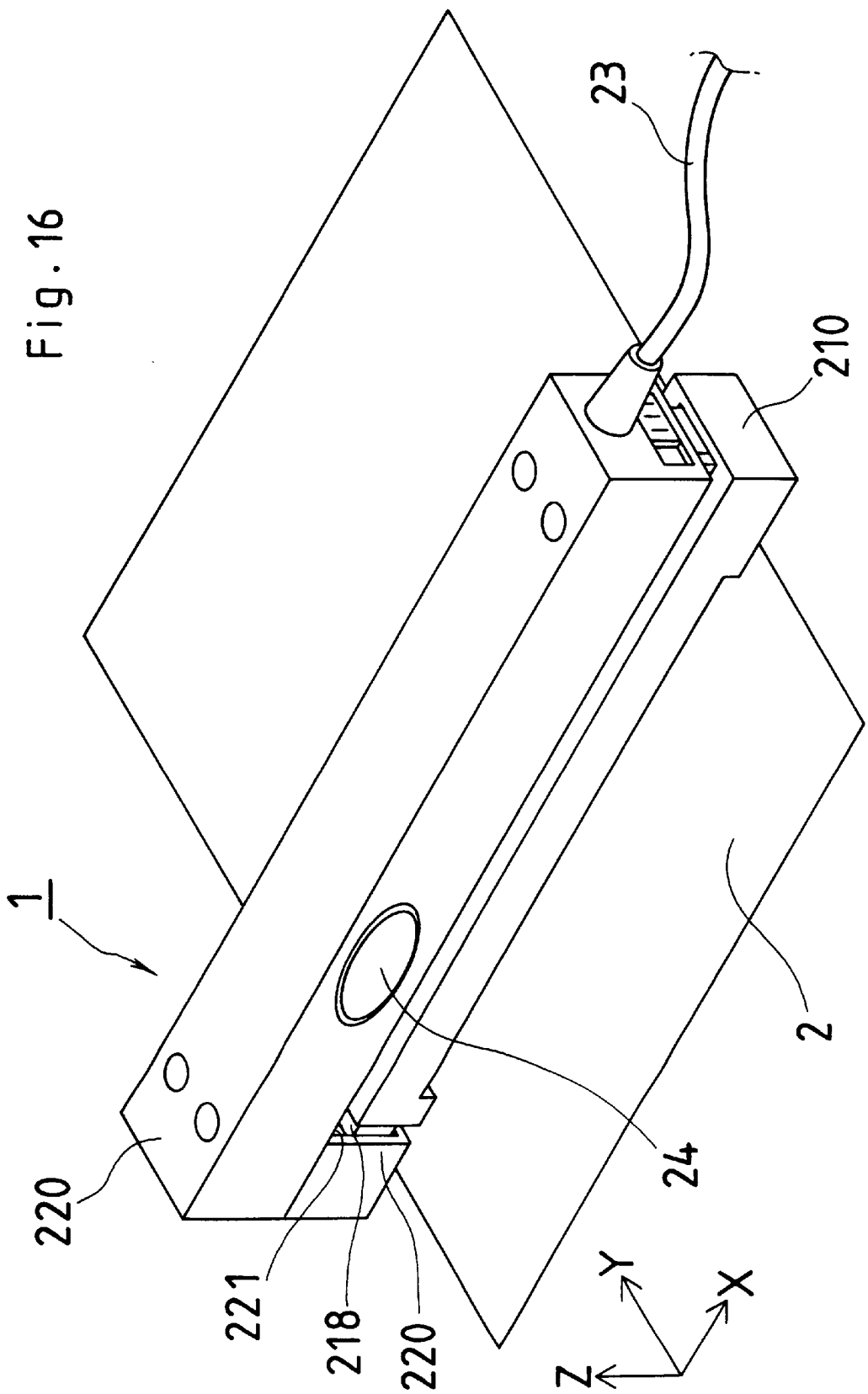
FIG. 16 is a perspective view showing the reading apparatus in FIG. 15 used in the manual feed mode.
Figure 17:
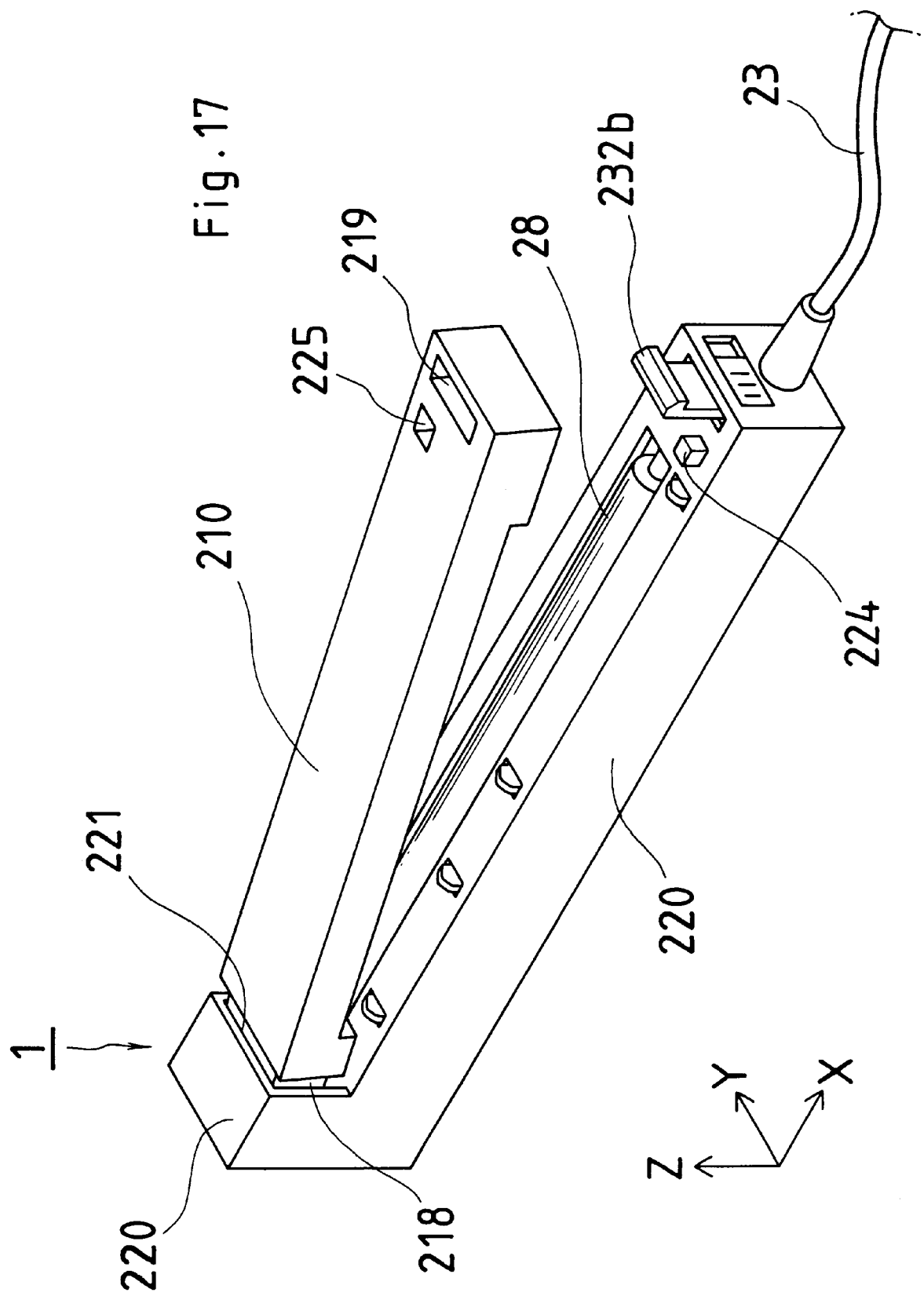
FIG. 17 is a perspective view showing the process of switching from the automatic feed mode in FIG. 15 to the manual feed mode in FIG. 16.

The outline of the present embodiment is explained using FIGS. 15, 16, and 17.

In the apparatus for reading character and image data according to the present embodiment, a holding portion 226, extending in the direction of the Z-axis that is perpendicular to the XY plane, is connected to and as part of one end of the roller block 220 sitting on the XY plane, and a catching portion 232b is installed on the other end of the roller block 220. The holding portion 226 and catching portion 232b are provided on the side where the driving roller 28 of the roller block 220 is exposed, as shown in FIG. 17, while a sensor block 210 has an insertion portion 218, for insertion into an engagement hole 221 (See FIG. 18) provided in the holding portion 226 of the roller block 220, formed on one end thereof, and an anchor hole 219, for engaging with the catching portion 232b of the roller block 220, formed on the other end thereof.

As shown in FIG. 15 and 17, when the sensor block 210 is positioned such that the reading surface of the reading unit 31 (FIG. 18) faces downwards (in other words, faces the driving roller 28 of the roller block 220), the insertion portion 218 is inserted into the engagement hole 221 of the roller block 220, and the catching portion 232b of the roller block 220 is caught by the anchor hole 219 of the sensor block 210, then the apparatus is in the automatic mode. In other words, as shown in FIG. 15, when the document 2 is inserted between the sensor block 210 and the roller block 220, the document 2 is automatically fed in the direction of the Y-axis by the driving roller 28 of the roller block 220, and during this process, the sensor unit 31 of the sensor block 210 reads text and images on the upper surface of the document 2.

Next, when the engagement of the anchor hole 219 of the sensor block 210 with the catching portion 232b of the roller block 220 is released, and the insertion portion 218 of the sensor block 210 is removed from the engagement hole 221 of the roller block 220, then the connection of the sensor block 210 and roller block 220 is completely released. Then, the sensor block 210 is turned around its lengthwise axis so that the reading surface of the sensor unit 31 faces away from the roller block 220. Then, the insertion portion 218 of the sensor block 210 is inserted again in the engagement hole 221 of the roller block 220, while the catching portion 232b of the roller block 220 is engaged with the anchor hole 219 of the sensor block 210 (this anchor hole 219 is formed on both the side where the reading surface of the sensor unit of the sensor block is located and on the side opposite thereto). This state is the manual feed mode as shown in FIG. 16. In this mode, when the reading apparatus 1 is manually moved so that the sensor block 210 is moved on the document placed on the XY plane, while keeping the reading surface of its the sensor unit 31 in contact with the document, then, text and images on the upper surface of the document 2 are read with the sensor unit 31 of the sensor block 210.

Next, the internal structure of the apparatus for reading character and image data 1 is explained with reference to FIG. 18.

Figure 18:
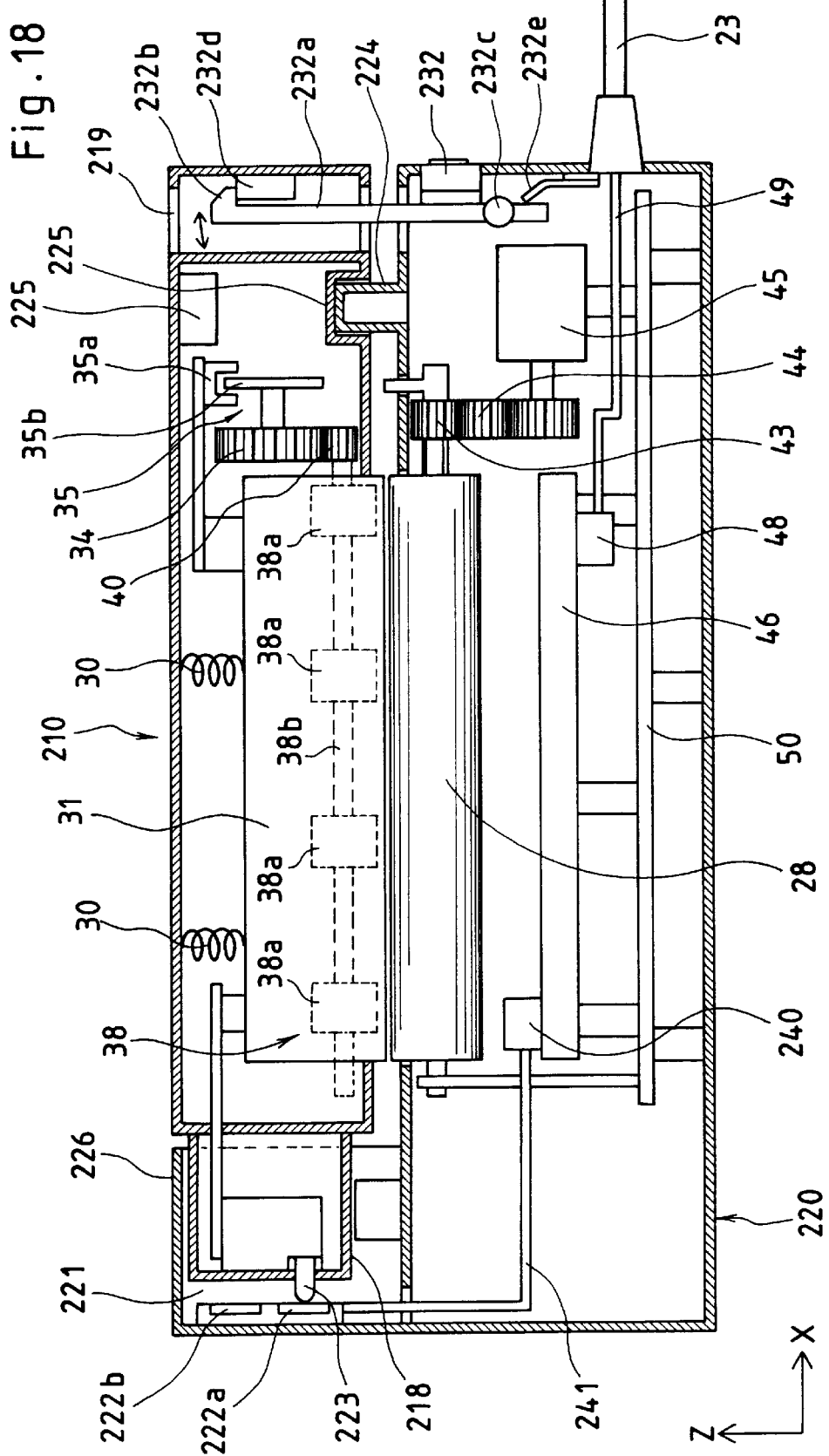
FIG. 18 is a cross sectional view schematically showing the internal structure of the reading apparatus in FIG. 15.

FIG. 18 shows the state where the sensor block 210 and roller block 220 are connected in automatic feed mode, as in FIG. 15. The same reference numerals as used for the components of the first embodiment shown in FIG. 3 are also applied to those elements in FIG. 18 having the same functions as those of the former. Explanation of components in common with those of the first embodiment is omitted and only components different from those of the first embodiment are explained below.

As shown in FIG. 18, two contact terminals, specifically a contact terminal 222a for automatic feed mode and a contact terminal 222b for manual feed mode, are provided on the inner wall of the holding portion 226 projecting from one end of the roller block 220. These two contact terminals 222a, 222b connect with the FPC 241. Meanwhile, the insertion portion 218 extends from one end portion of the sensor block 210, and a contact terminal 223 is installed on the front end of the insert portion. In FIG. 18, the contact terminal 223 connects with the contact terminal 222a for automatic feed mode, since the apparatus is in automatic feed mode. However, in the state where the sensor block 210 is set upside down (for manual feed mode) from the state in FIG. 18, the contact terminal 223 connects with the contact terminal 222b for manual feed mode. Further, a spring-loaded electrical connection with either the contact terminals 222a, 222b or the contact terminal 223 is ensured by the force of a spring (not shown).

The FPC 241 sends power and signals from the circuit board 46 to the sensor block 210 through the connector 240 and receives signals from the sensor block 210. Therefore, the conventional complex arrangement of male and female connectors are not necessary for an electrical connection of the roller block 220 and sensor block 210.

On the roller block 220, a protruding portion 224 is provided at a location near the end portion opposite to the end portion from which the holding portion 226 extends. Meanwhile, engagement holes 225 are provided on both the surface of the sensor block 210 where the reading surface is located (bottom surface in FIG. 18) and the surface opposite thereto (upper surface in FIG. 18). The apparatus is constituted so that the protruding portion 224 engages with either of the two engagement holes 225 in both automatic feed mode and manual feed mode. In either automatic feed mode or manual feed mode, as long as the projecting portion 224 engages with the engagement hole 225, longitudinal deviation of the sensor block 210 relative to the roller block 220 is prevented by virtue of the force of a spring provided on either the contact terminals 22a, 22b or the contact terminal 223.

Next, the structure for switching between the automatic feed mode and manual feed mode is explained with reference to FIGS. 18 and 19.

A bearing portion (not shown) for supporting the rotary support shaft 232c, provided on the end portion of the hook 232a, is provided on the end of the roller block 220 opposite to the end where the holding portion 226 is connected. In the state where the support shaft 232c is engaged with the bearing portion of the roller block 220, the upper portion of the hook 232a protrudes away from the roller block 220. A catching portion 232b is formed on the upper end of this hook 232a. Furthermore, a cam portion 232h, the height of which gradually increases in the axial direction of the support shaft 232c, specifically in the direction of the arrow A in FIG. 19, is provided at a position on the hook 232a slightly above the area where the support shaft 232c is formed.

The lower portion of a pushing panel 232e is fixed to the inner wall of the end of the roller block 220, while the upper portion is bent toward inside. The end of this pushing panel 232e is a free end. Furthermore, a slide button 232 is installed, so as to be able to slide in the direction of the Y-axis (in the direction of arrow A or B in FIG. 19), on the outside wall of the end of the roller block 220. A cam portion 232g is connected to the back surface of the slide button 232. This cam portion 232g is located on the inner side of the roller block 220, the height thereof gradually decreasing in the direction of the arrow A in FIG. 19 and corresponding to the cam portion 232h of the hook 232a. The slide button 232 is continually pressed in the direction of the arrow B in FIG. 19 by a coil spring 232f.

A catching member 232d is provided on the inside of the wall of the end of the sensor block 210 where the anchor hole 219 is provided. The catching portion 232b on the upper end of the hook 232a catches on this catching member 232d. A portion of the hook 232a, located lower than the support shaft 232, is pressed by the upper end of the pushing panel 232e. As a result, the engagement of the catching portion 232b with the catching member 232d is maintained by virtue of the clockwise force in FIG. 18 (force in the direction of arrow D in FIG. 19) acting on the hook 232a around the support shaft 232c.

Figure 19:
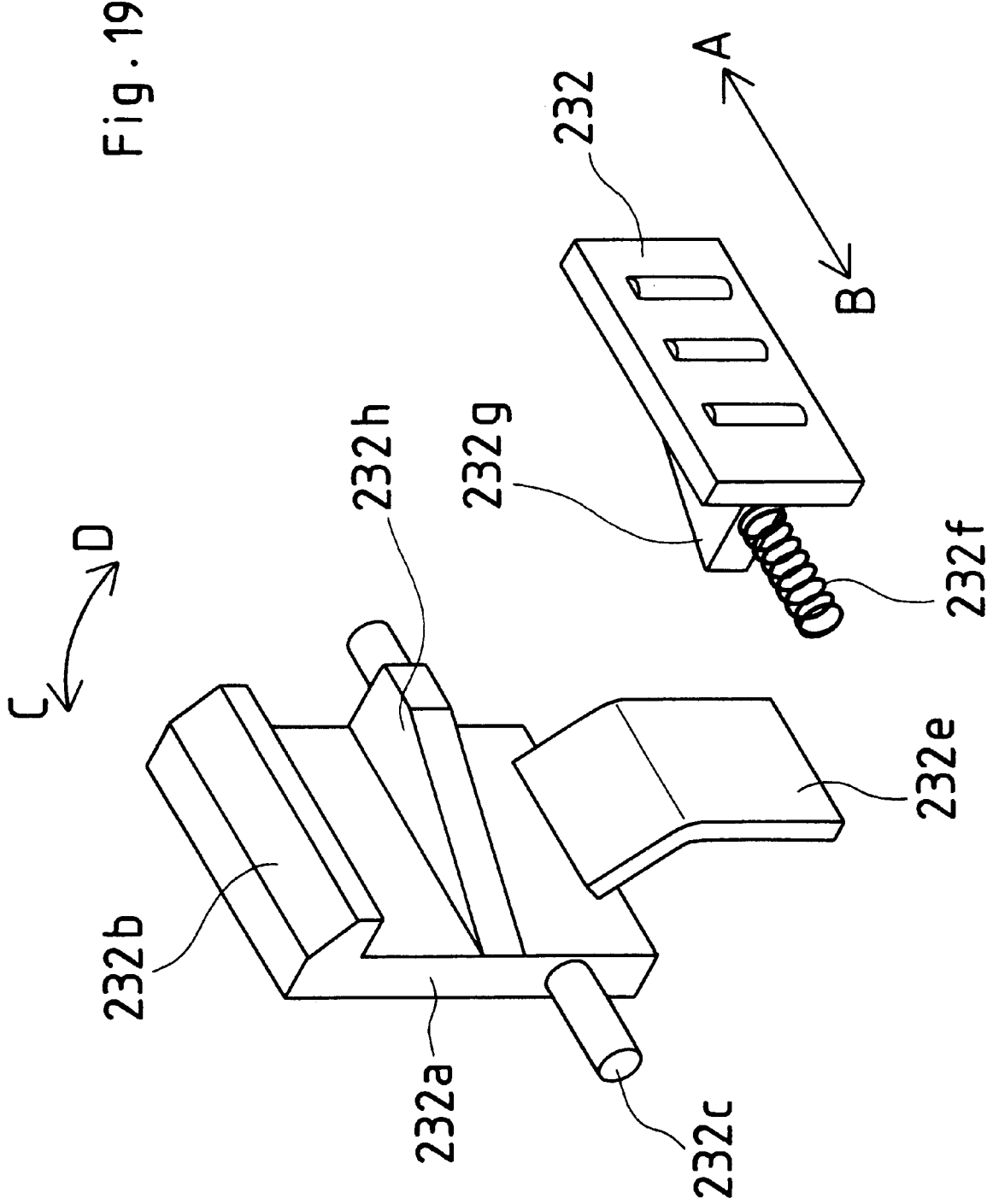
FIG. 19 is a perspective view of the hook and slide button shown in FIG. 18.

When the slide button 232 is slid in the direction of the arrow A in FIG. 19, the inclined surface of the cam portion 232g rides on the inclined surface of the cam portion 232h on the hook 232a, causing the cam portion 232h (or the upper portion of the hook 232a) to be pushed. Thereby, the hook 232a, resisting the pressing force of the pushing panel 232e, turns in a counterclockwise direction in FIG. 18 (in the direction of arrow C in FIG. 19) around the support shaft 232c. As a result, the engagement of the catching portion 232b with the catching member 232d is released. Then, the slide button 232 moves in the direction of the arrow B in FIG. 19 because of the spring force of the coil spring 232f and returns to the starting position.

As described above, when the catching portion 232b of the hook 232a is released from the catching member 232d by the action of the slide button 232, the coil spring, which heretofore keeps pressing (thus being compressed) the sensor block 210 against the roller block 220, is allowed to restore its original length by extending. As a result, the sensor block 210 is popped up from the roller block 220.

The sensor block 210 separated from the roller block 220 in this way is turned around its lengthwise axis, and the insert portion 218 thereof is inserted into the engagement hole 221 of the roller block 220. Then, the opposite end portion of the sensor block 210 is pressed down to the roller block 220. By doing so, the hook 232a passes through the engaging hole 219, and the catching portion 232b is caught by the catching member 232d. This, simultaneously makes the engagement hole 225 of the sensor block 210 engage with the protruding portion 224 of the roller block 220, thereby making the sensor block and roller block securely attached to each other for the manual feed mode.

In manual feed mode, the contact terminal 223 installed on the sensor block 210 forms an electrical connection with the contact terminal 222b for manual feed mode installed on the roller block 220.

Moreover, switching from manual feed mode to automatic feed mode may be effected by reversely following the procedure for the switching from automatic feed mode to manual feed mode described above.

As explained above, according to the present embodiment, the apparatus for reading character and image data comprises an insertion portion installed on one lengthwise end of the sensor block, an anchor hole on the other end of the sensor block, a holding portion having an engagement hole for engaging with the insertion portion installed on one lengthwise end of the roller block and a catching portion for catching on the anchor hole on the other end of the roller block, whereby switching from the automatic feed mode to manual feed mode or the reverse can be effected very easily by a series of operations beginning from releasing the catching portion of the hook by operating one slide button, followed by the successive operations of pulling, turning over, inserting, and pressing.

Further, electrical contact terminals are installed on both the insertion portion of the sensor block and the holding portion of the roller block, and one of these contact terminals is spring-loaded. Therefore the complex connector structures used heretofore become unnecessary, though necessary electrical connection is secured in both operating modes.

Further, lengthwise deviation of the roller block and sensor block can be prevented by the spring force of the contact terminals, because a protruding portion is provided on the document feed surface of the roller block and an engagement hole, for engaging with the aforementioned protruding portion, is provided on the sensor block.

Fourth Embodiment

The fourth embodiment according to the present invention is explained below using FIGS. 20–23.

Figure 20:
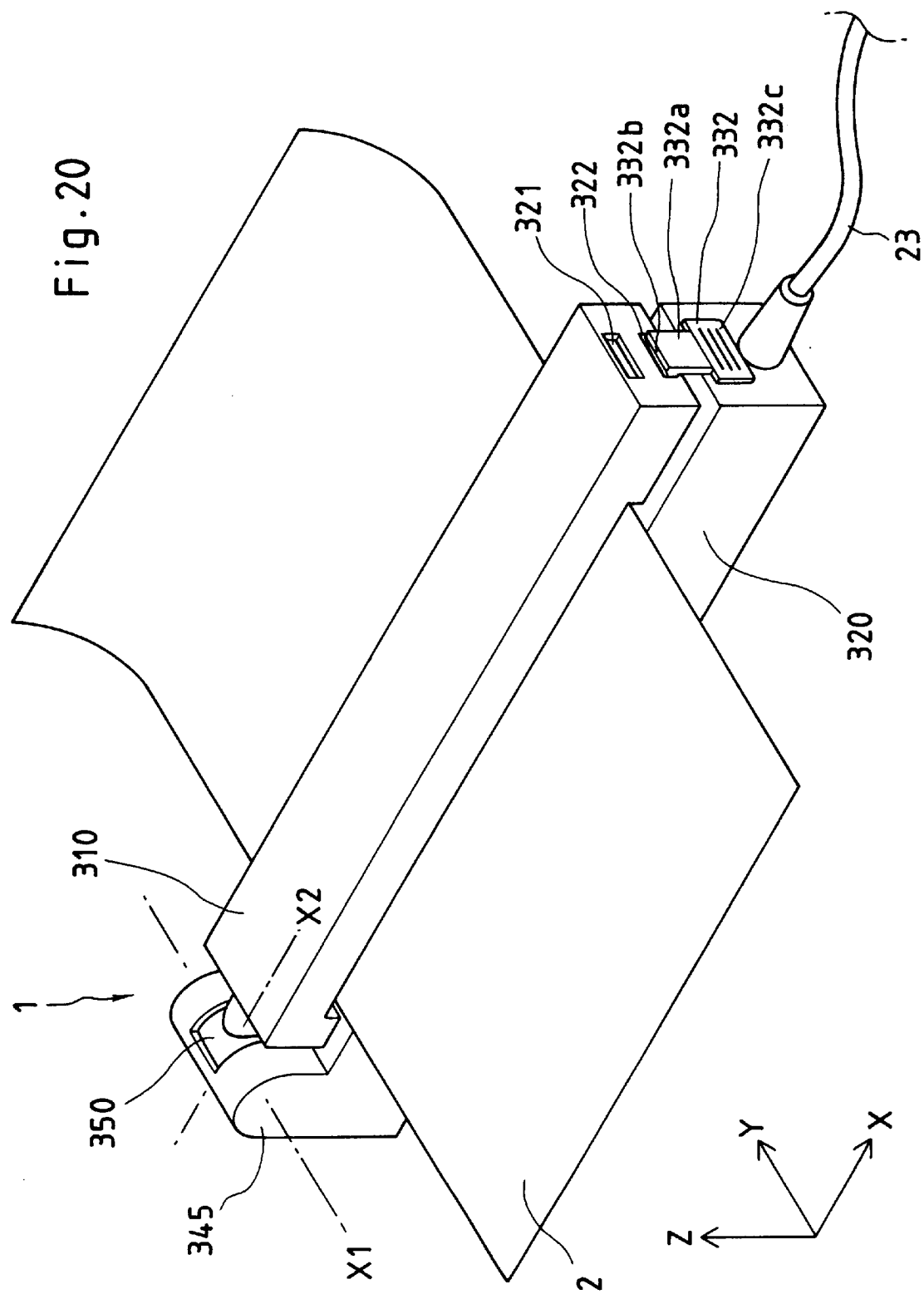
FIG. 20 is a perspective view showing a fourth embodiment of the reading apparatus according to the present invention used in the automatic feed mode.
Figure 21:
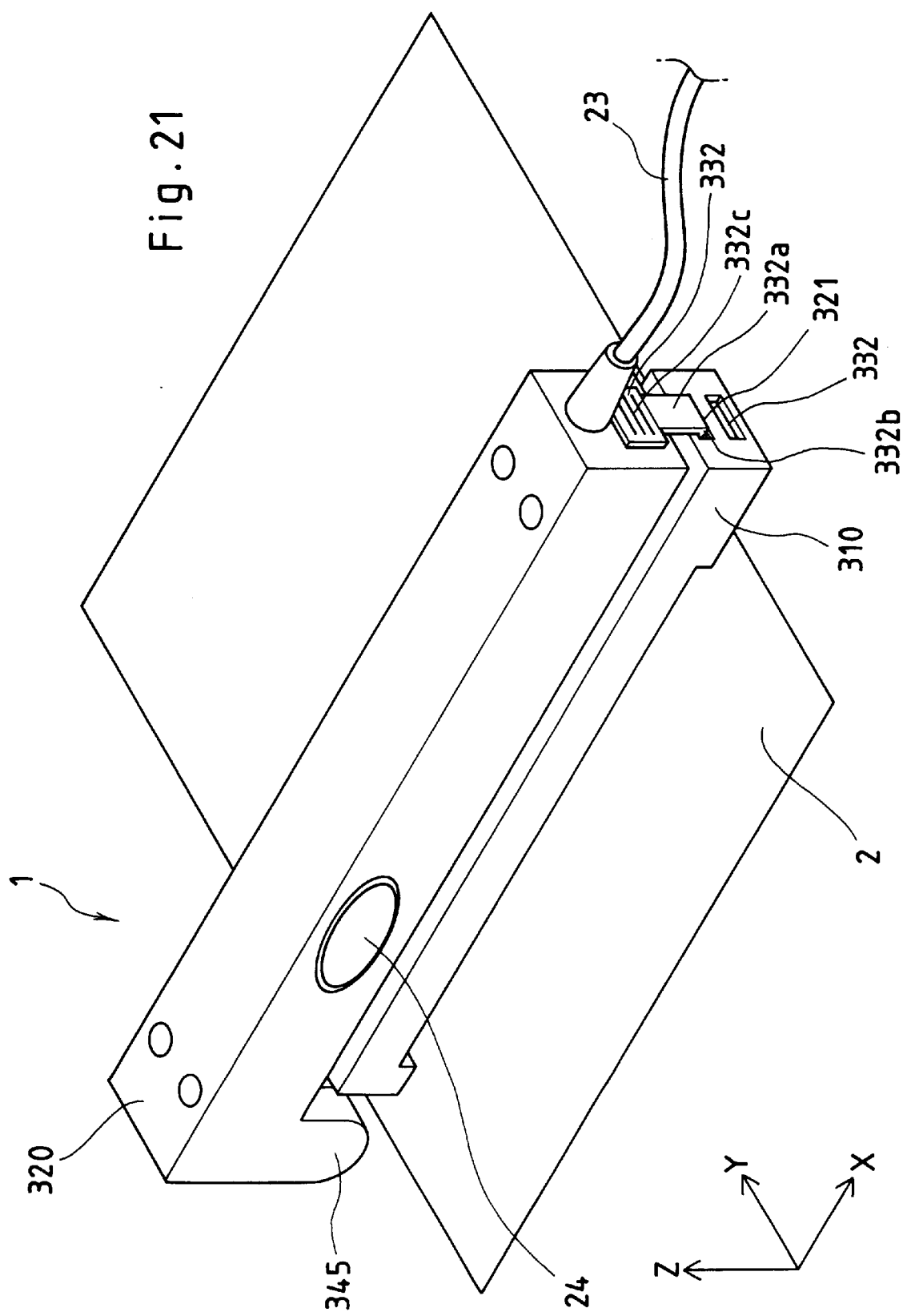
FIG. 21 is a perspective view showing the reading apparatus in FIG. 20 used in the manual feed mode.

The outline of the present embodiment is explained using FIGS. 20 and 21.

In the apparatus for reading character and image data according to the present embodiment, a bearing 345 is provided on one end of the roller block 320 on the XY plane, as shown in FIG. 20. This bearing 345 supports a support shaft 350 rotatably around the first axis X1 in the direction of paper feed (Y-axis). Furthermore, the sensor block 310 is connected to this support shaft 350 rotatably around a second axis X2 (lengthwise direction of sensor block 310), which is perpendicular to the first axis X1. Consequently, the sensor block 310 can rotate around the first axis X1 with respect to the roller block 320 and be brought near or away from the roller block 320. Also, the sensor block 310 can rotate around the second axis X2 and be turned over.

Meanwhile, anchor holes 321, 322 are formed on the other end of the sensor block, and a catching member 332, for catching in either of these anchor holes 321, 322, is mounted on the other end of the roller block 320.

In FIG. 20, the catching member 332 on the side of the roller block 320 catches in the second anchor hole 322 of the sensor block 310, and the reading surface of the sensor unit (not shown) of the sensor block 310 is opposite to the driving roller (not shown) of the roller block 320. In other words, the apparatus shown in this figure is in automatic feed mode.

When the other end (opposite to the end with support shaft 350) of the sensor block 310 in FIG. 20 is raised manually and rotated around the first axis X1, the other end of the sensor block 310 is separated from the roller block 320. When the sensor block 310 is manually rotated around the second axis X2 in this state, the sensor block 310 is turned over, and the surface which heretofore has faced the roller block 320 comes to be turned away from the roller block 320. Then, when the catching member 332 of the roller block 320 catches on the first anchor hole 321 of the sensor block 310, the apparatus is then in manual feed mode. Use of the reading apparatus 1 in manual feed mode is shown in FIG. 21, wherein the reading surface of the sensor unit of the sensor block 310 faces the document.

Next, the internal structure of the apparatus for reading character and image data 1 is explained with reference to FIG. 22.

Figure 22:
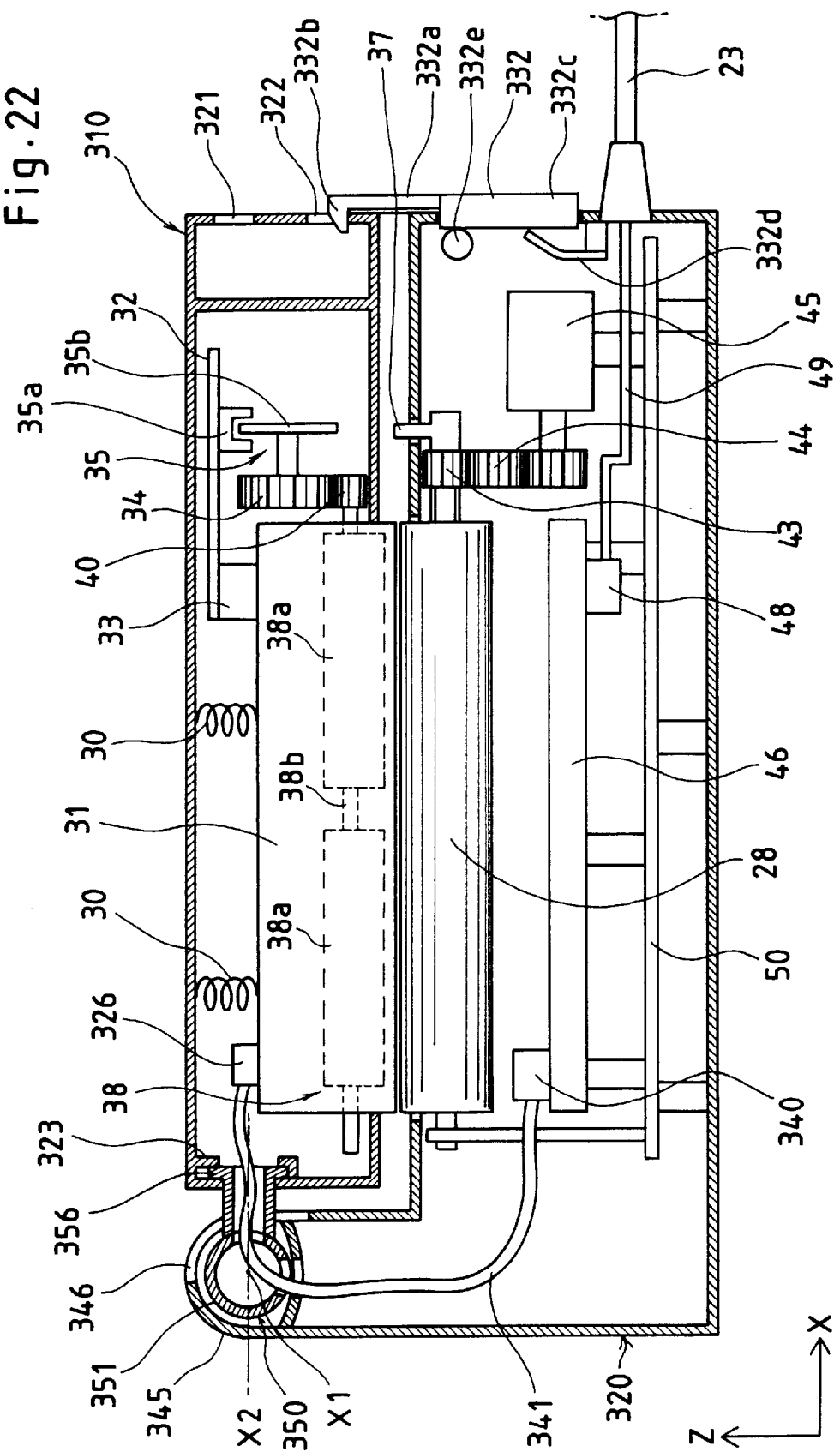
FIG. 22 is a cross sectional view schematically showing the internal structure of the reading apparatus in FIG. 20.

FIG. 22 shows the state where the sensor block 310 and roller block 320 are connected in automatic feed mode, like in FIG. 20. The same reference numerals as used for the components in the first embodiment shown in FIG. 3 are applied to those components in FIG. 22 on condition that those components have the same functions. Thus, explanation of components in common with those of the first embodiment is omitted, and only those components different from those of the first embodiment are explained below.

As shown in FIG. 22, a catching portion 323 for anchoring the support shaft 350 is provided on one lengthwise (X-axis direction) end of the sensor block 310, while, a first and second anchor hole 321, 322 are provided on the other lengthwise end of the sensor block 310. On the other hand, a bearing 345 for holding the support shaft 350 is provided on one end of the roller block 320 and a catching member 332 is provided on the other end.

The catching member 332 of the roller block 320 comprises a push button 332c, a hook portion 332a connected to the push button 332c, a support shaft portion 332e installed between the push button 332c and hook portion 332a, and a catching portion 332b installed on the end of the hook portion 332a. The back side (surface facing the inside of the roller block 320) of the push button 332c is pressed by an end of the pushing panel 332d mounted on the end of the roller block 320, so that the catching portion 332b on the end of the hook portion 332a is held in a state of being caught by the second anchor hole 322 of the sensor block 310.

The signal from the photointerrupter 35a constituting the rotary encoder 35 is sent to the circuit board 46 through the FPC 32, connector 33, connector 326, cable 341, and connector 340.

Figure 23:
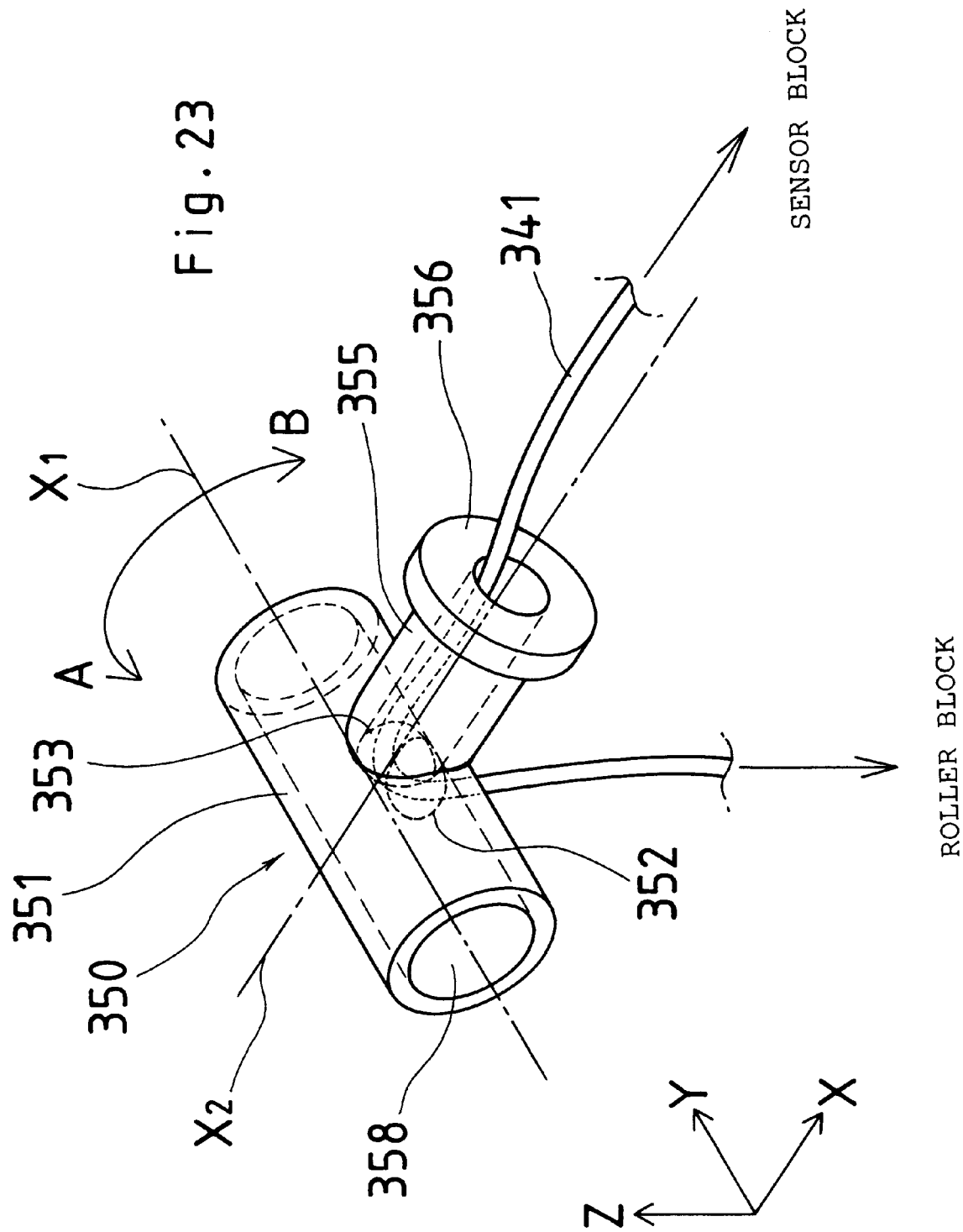
FIG. 23 is a perspective view showing the principal elements of the support portion shown in FIG. 22.

Next, the support shaft 350 is explained using FIG. 23.

The support shaft 350 comprises a first tubular rotary portion 351 fitting in the bearing 345 installed on the roller block 320, and a second rotary portion 355 extending perpendicularly from the rotary portion 351. This first rotary portion 351 is supported by the bearing 345 of the roller block 320 and rotates around a first axis X1, in the Y-axis direction (direction of document feeding by the driving roller 28 of the roller block 320) with respect to the roller block 320, while a flange-shaped anchor portion 356 is formed on the end of the second rotary portion 355; this anchor portion 356 is anchored on the catching portion 323 installed on one end of the sensor block 310. The sensor block 310 can therefore be turned around a second axis X2, perpendicular to the first axis X1, with respect to the second rotary portion 355.

The inside path of the first rotary portion 351 and the inside path of the second rotary portion 355 communicate each other through a hole 353 formed at a location where theses two inside paths meat each other. Further, a hole 352 is formed at one location on the first rotary portion 351. As a result, a cable 341 from the sensor block 310 can pass through the inside path of second rotary portion 355, the inside path of first rotary portion 351 and comes out from the hole 352 to reach the roller block 320. Consequently, this cable 341 can form an electrical connection between the sensor block 310 and the roller block 320.

Next, the procedure for switching from the automatic feed mode to the manual feed mode, as shown in FIGS. 20 and 22, will be explained.

Manually pressing the push button 332c of the catching member 332, the catching member 332 turns around the shaft portion 332e against spring force of the pushing panel 332d, then the catching portion 332b on the end of the hook portion 332a comes out from the second anchor hole 322. As a result, the coil spring 30, which has heretofore pressed (therefore, has been compressed) the sensor block 310 against the roller block 320, comes to stretch to return to its original length. As a result, the sensor block 310 is popped up away from the roller block 320. Next, the popped up sensor block 310 is rotated substantially 90° around the first axis X1 in a direction away from the roller block 320.

The sensor block 310 is rotated to a certain angle around the first axis X1 so that the end of the sensor block 310 where the first anchor hole 321 is formed is separated from the roller block 320. Then the sensor block 310 itself is rotated 180° around the second axis X2 with respect to the support shaft 350. By doing so, the reading surface of the sensor unit 31 of the sensor block 310 then faces away from the roller block 320.

In this state, the sensor block 310 is turned around the first axis X1 to be brought close to the roller block 320. Then the catching portion 332b on the end of the hook portion 332a is caught by the first anchor hole 321 formed on the end of the sensor block 310, whereupon the apparatus is in manual feed mode.

Switching from manual feed mode to automatic feed mode may be accomplished by reversely following the foregoing procedure for switching from automatic feed mode to manual feed mode.

The cable 341 for electrically connecting the roller block 320 and sensor block 310 passes through the first rotary portion 351 and the second rotary portion 355, as described above; however, the cable 341 is not twisted during mode switching, because the second rotary portion 355 does not turn more than 180° when turning over the sensor block 310.

Fifth Embodiment

Figure 24:
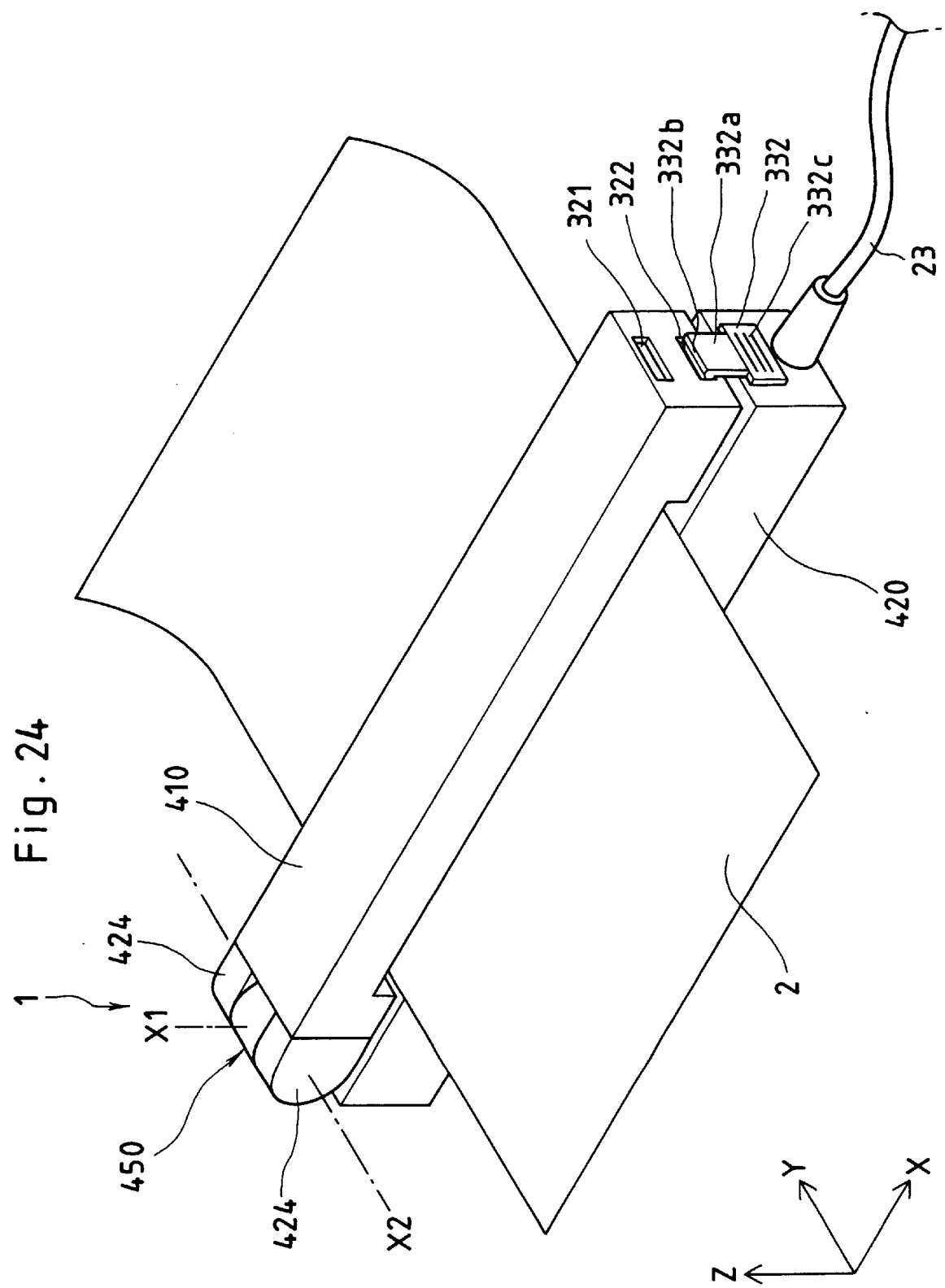
FIG. 24 is a perspective view showing a fifth embodiment of the reading apparatus according to the present invention used in the automatic feed mode.
Figure 25:
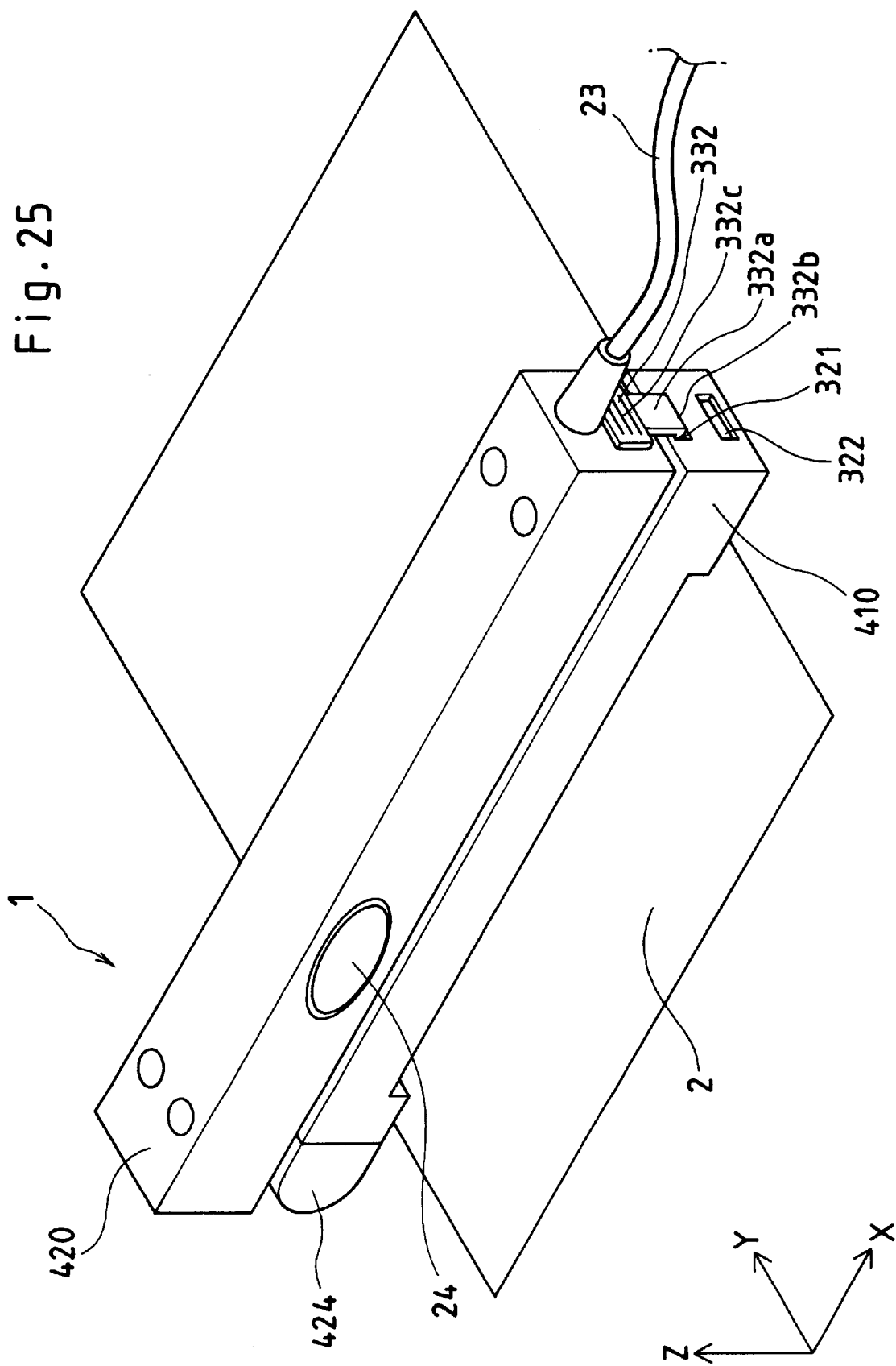
FIG. 25 is a perspective view showing the reading apparatus in FIG. 24 used in the manual feed mode.

The outline of the present embodiment is explained using FIGS. 24 and 25.

In the apparatus for reading character and image data 1 according to the present embodiment, as shown in FIG. 24, the support shaft 450, provided on one end of the roller block 420 placed on the XY plane, is installed rotatably around a first axis X1, being in the direction of the Z-axis and perpendicular to the XY plane, with respect to the roller block 420. Furthermore, a bearing portion 424, connected to one end of the sensor block 410, is fitted on the support shaft 450, enables sensor block 410 to rotate around a second axis X2, being perpendicular to the first axis X1, with respect to the support shaft 450.

Therefore, the sensor block 410 is rotated nearly 180° around the second axis X2 with respect to the roller block 420; as a result, the sensor block 410 is essentially turned over. Then, the sensor block 410 is then rotated around the first axis X1 and brought to a position just above the roller block 420. In this stare, the sensor block 410 is turned over from previous position with respect to the roller block 420.

Further, in this embodiment, the first and second anchor holes 321 and 322 are formed on the end of the sensor block 410, on the side opposite to the side where the bearing portion 424 is connected, and further, the catching member 332 for anchoring in the anchor holes 321, 322 is provided on the end of the roller block 420. The foregoing constitution is the same as the case of the fourth embodiment shown in FIGS. 20–22, and thus the reference numerals in the drawings used for explaining the related constitution in the present embodiment are the same as those used for explaining the foregoing fourth embodiment.

When the sensor block 410 of the reading apparatus 1 in the automatic feed mode in FIG. 24 is rotated more than 90° but less than 180° around the second axis X2 of the support shaft 450, the sensor block 420 is not positioned above the roller block 420, and the reading surface of the sensor unit 31 of the sensor block 410 is turned away from the roller block 420.

The sensor block 410 (and support shaft 450) in this state is then rotated 180° around the first axis X1 with respect to the roller block 420, in which the sensor block 410 is brought right above the roller block 420. In this state, however, the angle around the second axis X2 of the roller block 420 and sensor block 410 is an angle of 0–90°. The sensor block 410 is then rotated around the second axis X2 and the sensor block 410 is laid on the roller block 420. When the catching portion 332b of the catching member 332 is then anchored in the first anchor hole 321, the apparatus is placed in manual feed mode. FIG. 25 shows the condition of the reading apparatus 1 when using in manual feed mode, in which the reading surface of the sensor unit of the sensor block 410 faces the document to be read.

Figure 26:
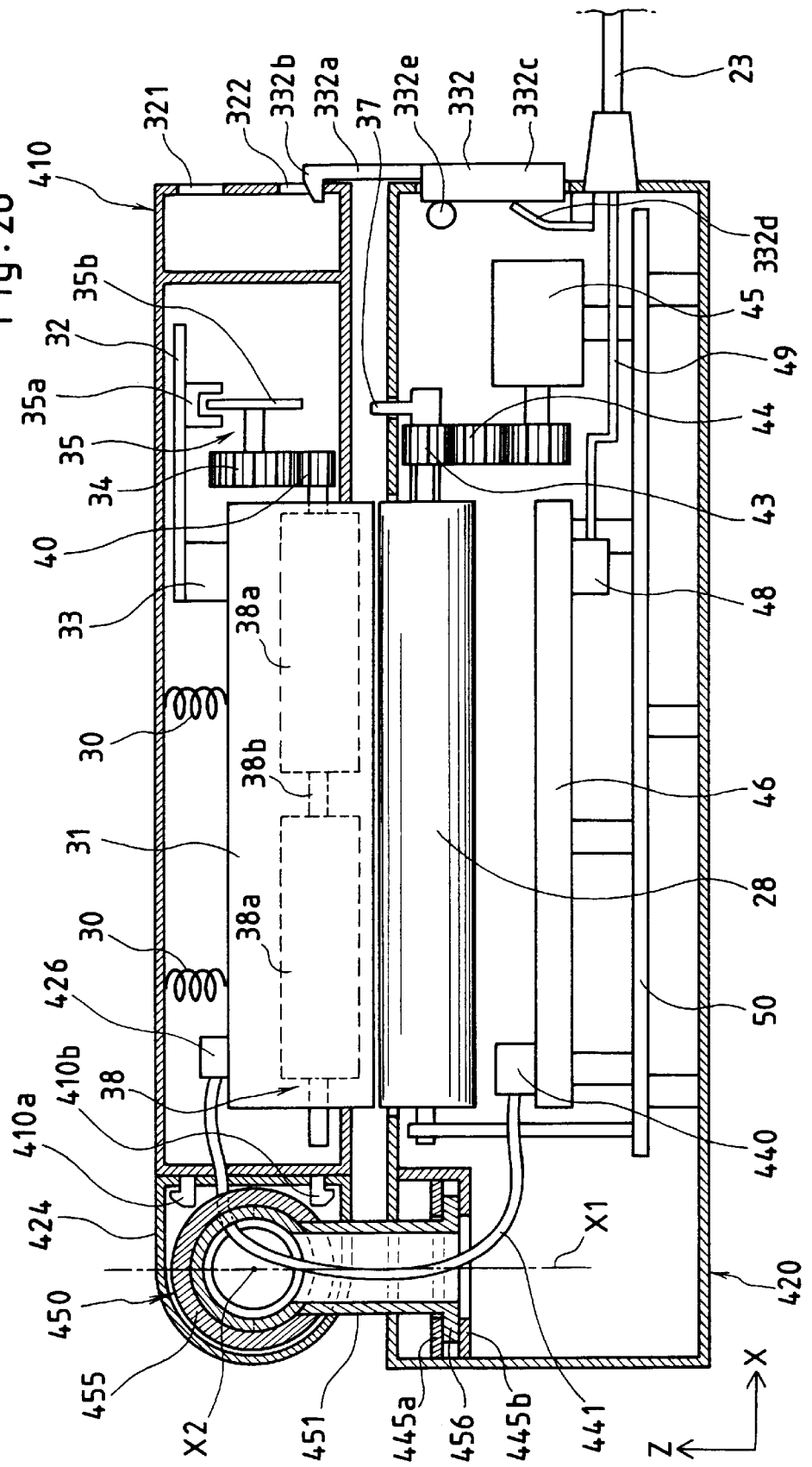
FIG. 26 is a cross sectional view schematically showing the internal structure of the reading apparatus in FIG. 24.

The internal structure of the present embodiment is explained with reference to FIG. 26. Incidentally, in the figure for explaining the present embodiment, the reference numerals same as those used in figures for explaining the first embodiment denote those components same as those in the present embodiment.

Hook portions 410a, 410b, for engaging with the bearing portion 424, protrude from one end surface (end surface opposite to the end where the anchor holes 321, 322 are formed) of the sensor block 410. Further, the bearing portion 424 may be formed integrally with the sensor block 410.

The support shaft 450 comprises a first tubular rotary portion 451 and a second tubular rotary portion 455 extending in a direction perpendicular to the rotary portion 451. A flange-shaped anchor portion 456 is formed on the lower end of the first rotary portion 451, whereas anchor portions 445a, 445b, for receiving the anchor portion 456 and supporting the first rotary portion 451 rotatably around the first axis X1, are installed on one end of the roller block 420. The upper half of the first rotary portion 451 extends out of the surface of the roller block 420 where the driving roller 28 is exposed.

The second rotary portion 455 is affixed on the upper end of the first rotary portion 451. The axis of the second rotary portion 455 intersects with the axis of the first rotary portion 451 and becomes the second axis X2 of the support shaft 450. A bearing portion 424, mounted on one end of the sensor block 410 by means of hook portions 410a, 410b, is fit on both sides of this second rotary portion 455.

Arranged as above, the sensor block 410 becomes rotatable around the second axis X2 of the support shaft 450 with respect to the support shaft 450, and both the sensor block 410 and support shaft 450 become rotatable around the first axis X1 of the support shaft 450 with respect to the roller block 420.

Figure 27:
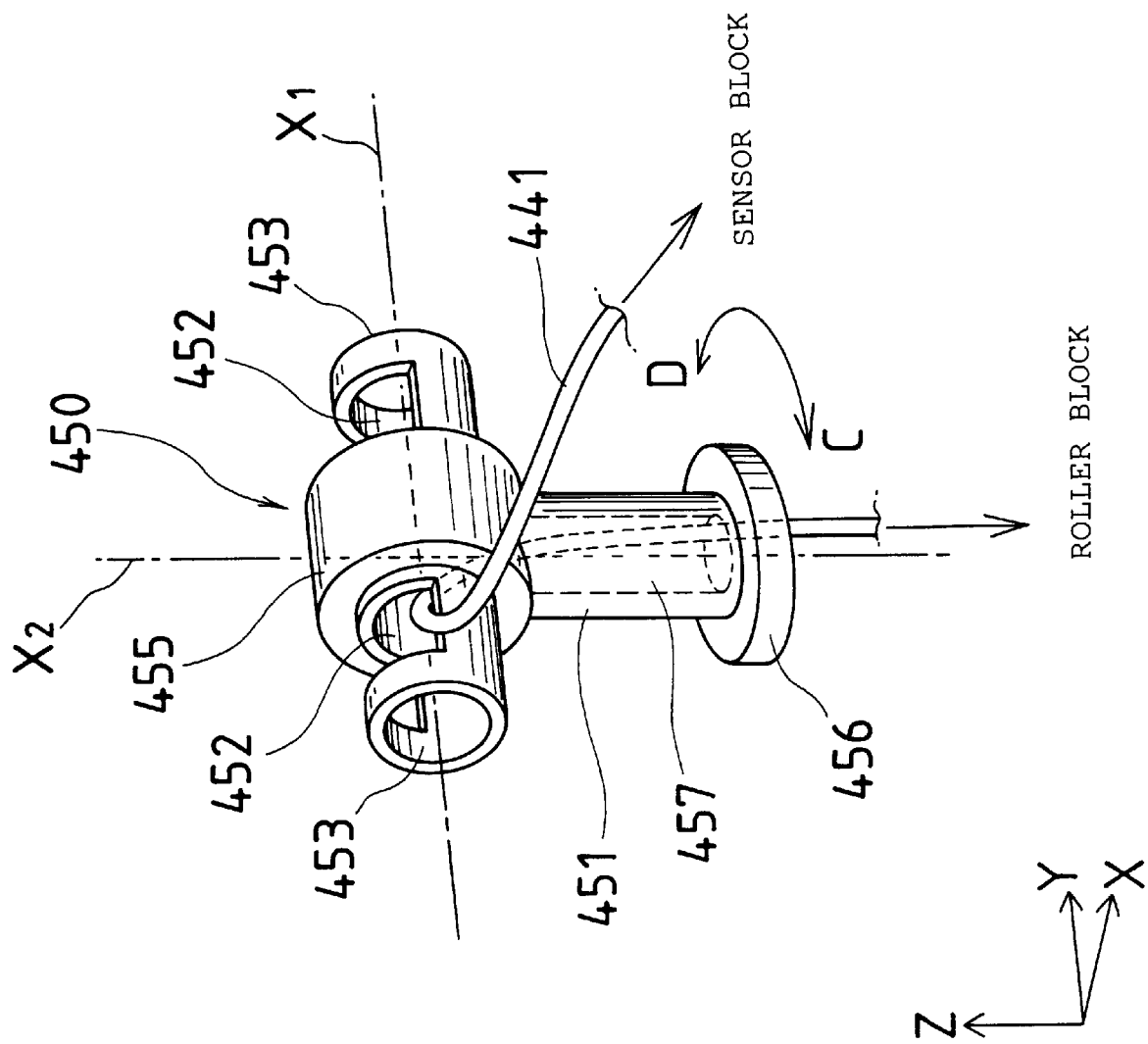
FIG. 27 is a perspective view showing the principal elements of the supporting shaft shown in FIG. 26.

Next, the constitution of the support shaft 450 is explained using FIG. 27.

As described above, the support shaft 450 comprises a first tubular rotary portion 451 and a second tubular rotary portion 455 extending from the rotary portion 451 in a perpendicular direction. An opening 451 is formed in the second rotary portion 455. Through holes 453, 457, through which a cable 441 passes, are formed in the first rotary portion 451 and second rotary portion 455. Therefore, the cable 441 from the sensor block 410 (connector 426) can pass from this opening 452, through the second rotary portion 455, and then through the first rotary portion 451, to reach the roller block 420 (connector 440). In other words, the cable 441, to provide an electrical connection between the sensor block 410 and roller block 420, can pass through this support shaft 450.

As explained above, the apparatus for reading character and image data according to the fourth and fifth embodiments can be switched from the automatic feed mode to the manual feed mode or reversed quite easily by a series operations using a single push button such as releasing the catching portion of the hook portion, and pushing up, rotating, and pushing down the sensor block, thereby providing high operating efficiency.

Furthermore, a high electrical reliability can be obtained, since the sensor block rotates within a 180° range, and thus the cable passing through the support shaft can be prevented from being twisted.

Consequently, as described above, it becomes possible to provide an apparatus for reading character and image data, having a high operating efficiency and high reliability, which would relieves the work load of an operator and make the electrical connection trouble-free, because the operation for switching from one mode to the other is easy.

(Document Tray as an Accessory)

The apparatus for reading character and image data according to the present invention can be provided with a document tray on the side of the roller block, in order to make it easy to insert the leading edge of the document into the space between the roller block and sensor block when in automatic feed mode. This document tray is explained below using FIGS. 28–31.

Figure 30:
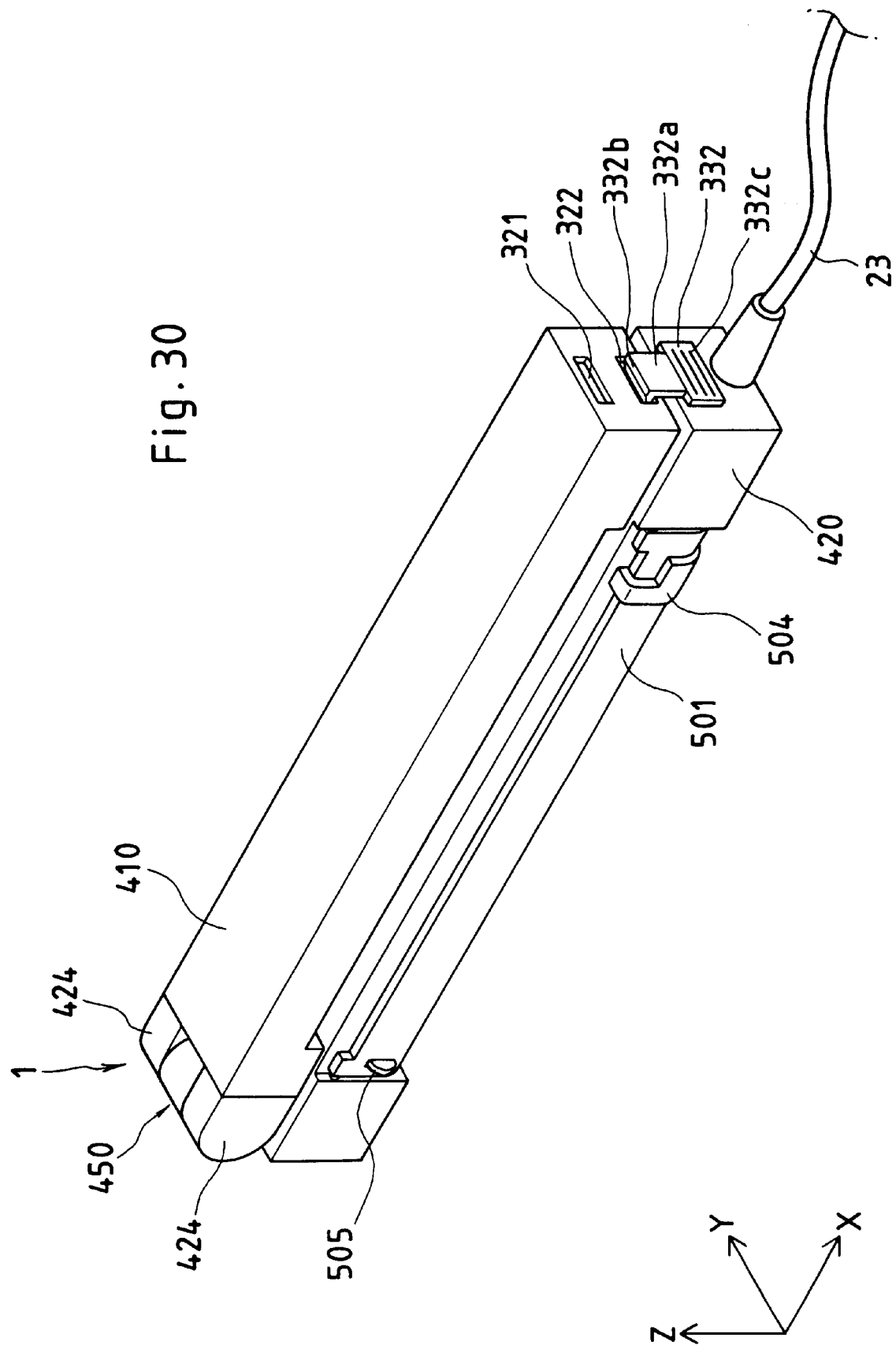
FIG. 30 is a perspective view showing the document tray in FIG. 28 in stored condition.

The apparatus for reading character and image data 1 shown in FIGS. 28 and 30 has the same structure as the apparatus 1 according to the fifth embodiment in FIG. 24. Thus, the same reference numerals are used for those components identical to those shown in FIG. 24.

However, a storage depression 421, for storing the document tray 501, having a form described below, is formed from one side to the bottom surface, excluding the right and left end portions, on the roller block 420 shown in FIGS. 28 and 30.

The document tray 501 comprises a single panel with an L-shaped cross section and a horizontal width slightly greater than the maximum width of the document 2 to be used, as shown in FIG. 28. Pins 502 protrude outward from both the right and left rear ends of the document tray 501 as shown in FIG. 29, whereas pin insertion holes (not shown), for rotatably receiving the pins 502, are formed on the right and left wall surfaces (not shown) defining the storage depression 421 of the roller block 420.

The document tray 501, wherein the right and left pins 502 are fit in the pin insertion holes of the roller block 420, can rotate on those pins 502. As shown in FIG. 28, the rear edge thereof can be in a state (state for use) of abutting the platform (not shown) whereon the roller block 420 rests. Also, the rear edge thereof can be in a state (stored state) wherein the document tray 501 is stored in the storage depression 421 of the roller block 420, as shown in FIG. 30.

When the document tray 501 is in the state for use as shown in FIG. 28, the entire document tray 501 protrudes from the rear of the roller block 420. The front half portion (portion located in the XY plane) supports from below the document 2 passing through the space between the roller block 420 and sensor block 410. Also, the rear half portion (portion located in the XZ plane) of the document tray 501 forms a leg and supports the document tray 501 in the state for use.

A narrow slot 503, extending in a widthwise direction, is formed in the center of the portion of the document tray 501, the portion (the rear half portion of the tray 501) serving as a leg. A depression, having a small depth, is formed in the front edge of the document tray 501, excluding the area near the pins 502. One end of the document guide 504 engages with the slot 503 in the document tray 501, while the other end engages with the depressed portion on the front edge of the document tray 501. The document guide 504 is movable along the narrow slot 503 on the document tray 501. Further, a guide protrusion 505, for regulating the position of the document 2 by contacting the side edge of the document 2 is provided near one side (left end in FIG. 28) of the front half of the document tray 501.

Consequently, the document 2 placed on the front half of the document tray 501 passes through the space between the roller block 420 and the sensor block 410, with its left edge regulated by the guide protrusion 505 and the right edge by the document guide 504, as shown in FIG. 28. When the size of the document 2 is changed, the document guide 504 is slid so that its position on the document tray 501 is adjusted.

When the document tray 501 is not in use, the roller block 420 can be lifted from the platform. Then, the document tray 501 can manually be pushed toward the roller block 420 and can easily be housed in the storage depression 421 formed on the roller block 420, as shown in FIG. 30. In this state, the document tray 501 in this state does not protrude from the roller block 420, since the front half thereof becomes substantially flush with the side surface of the roller block 420, while the rear half thereof becomes substantially flush with the bottom surface of the roller block 420.

The document tray 501 shown in FIGS. 28–30 is explained to be attachable to the apparatus 1 according to the fifth embodiment shown in FIG. 24 (on condition that the housing depression 421 and pin receiving holes are to be formed on the roller block). However, this document tray 501 can also be attached to apparatus 1 according to other embodiments.

Further, this document tray 501 may be designed to be removable from the roller block 420 when not in use. For example, the width of the document tray 501 can be made somewhat smaller than the width of the housing depression 421 formed on the roller block 420 so that the document tray 501 can be moved towards either the right or left within the housing depression 421 of the roller block 420 and so that the pins 502 of the document tray 501 can be removed from the pin insertion holes formed on the roller block 420. By doing so, when the document tray 501 need not to be used, it can be either removed from the roller block 420 or housed in the housing depression 421 of the roller block 420.

Figure 31:
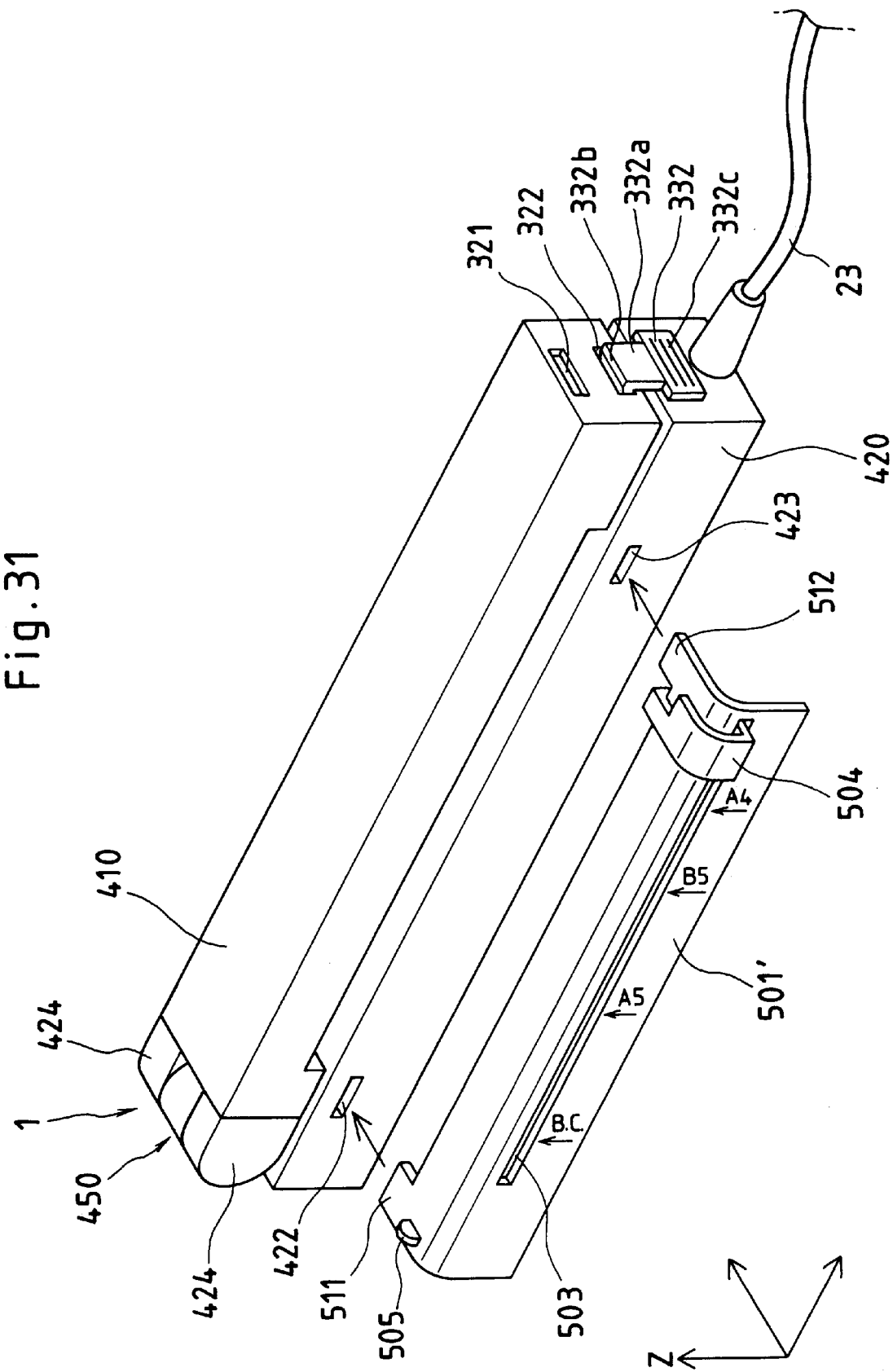
FIG. 31 is a diagram showing a document tray differing from the document tray in FIG. 28, which is attachable to and removable from the roller block.
Figure 32:
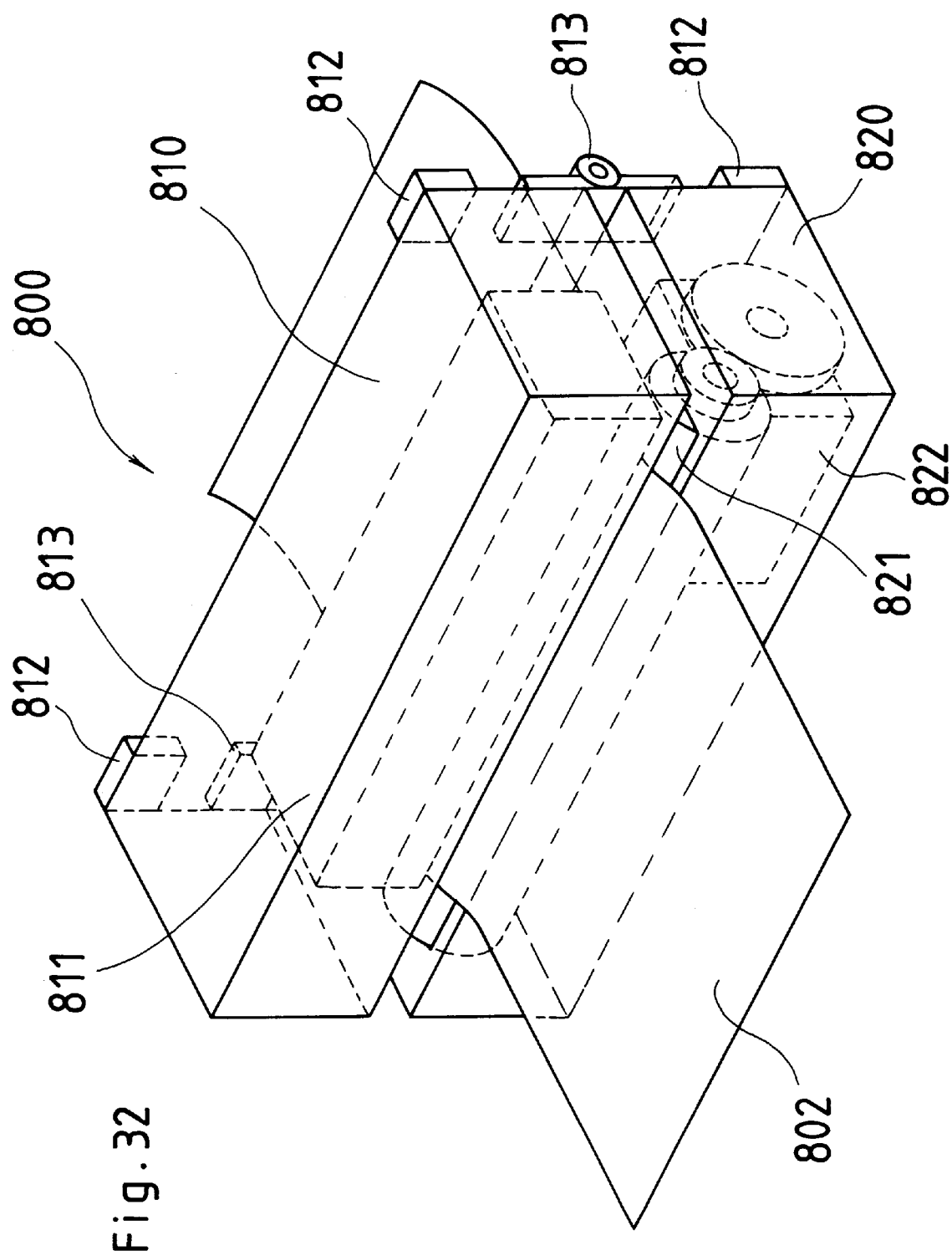
FIG. 32 is a perspective view showing an example of a conventional apparatus for reading character and image data and shows the usage thereof in automatic feed mode.

Furthermore, a document tray 501' having a form different from that of the document tray 501 shown in FIGS. 28–30 will be explained below using FIG. 31.

This document tray 501' also comprises a single L-plate, like the document tray 501 shown in FIGS. 28–30, and is provided with a pair of protruding portions 511, 512, extending in the document feed direction (Y-direction) from the front edge thereof, whereas, a pair of insertion holes 422, 423, for receiving the protruding portions 511, 512 of the document tray 501', are formed in the side surface of the roller block 420. When using this document tray 501', the left and right protruding portions 511, 512 of the document tray 501' are inserted into the left and right insertion holes 422, 423 on the roller block 420 respectively. When the use of the document tray is finished, the protruding portions 511, 512 of the document tray 501' are drawn from the insertion holes 422, 423 of the roller block 420 and is separated from the roller block 420.

This document tray 501', which is removable from the roller block 420, has the same form as the document tray 501 shown in FIGS. 28–30, except for the constitution of the protruding portions 511, 512. In other words, the document tray 501' shown in FIG. 31 comprises a narrow slot 503, document guide 504, and guide protrusion 505, like the document tray 501 shown in FIGS. 28–30.

What is claimed is:

1. An apparatus for reading character and image data comprising:

a sensor block housing a reading sensor for reading image data on a document;

a roller block housing a driving roller for feeding the document and a motor for driving the driving roller; and coupling means for coupling said sensor block to said roller block in a first position where the sensor block is placed on the roller block in a manner such that the reading surface of the reading sensor of the sensor block faces the driving roller of said roller block, and also in a second position where the roller block is positioned on the sensor block in a manner such that the reading surface of the reading sensor in the sensor block is turned away from the driving roller of the roller block.

2. The apparatus for reading character and image data according to claim 1, comprising:

connector means with connecting terminals for sending and receiving a plurality of electrical signals between said sensor block and said roller block;

means for detecting operation mode for determining whether said sensor block and said roller block are coupled in said first position or in said second position and outputting the result of the determination; and signal switching means for switching the signal connection mode between roller block and sensor block according to the output signal of said means for detecting operation mode.

3. The apparatus for reading character and image data according to claim 1 or 2, wherein said roller block is provided with a protruding connector comprising a group of connecting terminals; while said sensor block is formed with insertion apertures for receiving the protruding connector of said roller block on the surface where the reading surface of the reading sensor is located and also on the surface opposite thereto; and a group of connecting terminals corresponding to said connecting terminals is provided in the insertion apertures.

4. The apparatus for reading character and image data according to claim 2, wherein the group of connecting terminals on said sensor block and the group of connecting terminals on said roller block are arranged respectively in a direction orthogonal to the axis of the driving roller.

5. The apparatus for reading character and image data according to claim 2, wherein the connecting terminals of the connector on said roller block are constituted of a flexible printed circuit (FPC).

6. The apparatus for reading character and image data according to claim 1, wherein said coupling means comprises a guide pin, provided on the surface of said roller block where the driving roller is exposed, and a guide hole, passing from the surface of said sensor block where the reading surface of the reading sensor is located to the surface opposite thereto.

7. The apparatus for reading character and image data according to claim 1, wherein said coupling means comprises a pair of rotary support members mounted movably on both ends of the roller block to be movable between a first position close to the roller block and a second position separated from the roller block; wherein these rotary support members support the sensor block rotatably between both rotary support members; and when said rotary support members are in the second position separated from the roller block, the sensor block can be rotated at least 180° with respect to these rotary support members without being obstructed by the roller block.

8. The apparatus for reading character and image data according to claim 7, wherein said rotary support member support mechanism comprises a slide portion connected to each rotary support member and a guide portion provided on said roller block so as to slidably receive the slide portions; said slide portion further comprises a flexible branch having a hook on the end thereof; and said roller block is provided with a member which has a first catching portion and a second catching portion for engaging with said hook, said first and second catching portions being arranged apart from each other in the direction in which the sensor block approaches to and retreats from the roller block.

9. The apparatus for reading character and image data according to claim 7, wherein a cable for electrically connecting said roller block with said sensor block passes through one of said pair of rotary support members.

10. The apparatus for reading character and image data according to claim 7, wherein each of said pair of rotary support members has a cylindrical boss portion protruding from the surface thereof; boss receiving portions for receiving these boss portions is formed on both ends of the sensor block; cut-out portions is formed at two locations and in an axial direction on the circumference of the boss portion of at least one of the rotary support members; a hook portion, which can be engaged with and disengaged from said cut-out portion, is formed on the boss receiving portion corresponding to the boss portion; and wherein, when the hook portion of said boss receiving portion is engaged with one of the cut-out portions of said boss portion, the sensor block assumes the first position, with the reading surface of the reading sensor thereof facing the driving roller of said roller block; and, when the hook portion of said boss receiving portion is removed from said one cut-out portion and is engaged with the other cut-out portion, then the sensor block assumes the second position, with the reading surface of the reading sensor thereof being turned away from the roller block.

11. The apparatus for reading character and image data according to claim 10, wherein a stopper pin is provided on the boss portion which has the cut-out portion; and a stopper pin guide slot, for guiding said stopper pin, is formed on the boss receiving portion which engages with the boss portion; the stopper pin moves along the stopper pin guide slot, between one end corresponding to said first position and the other end corresponding to said second position.

12. The apparatus for reading character and image data according to claim 10, wherein the electrical connection of said roller block with said sensor block is established by the cable from said roller block passing through the cylindrical boss portion of the rotary support member, and part of the boss receiving portion of the sensor block for receiving the boss portion to reach the sensor block.

13. The apparatus for reading character and image data according to claim 1, wherein said coupling means comprises a first and second engaging portions provided on one end and the other end of said sensor block; and a first and second engaging portions provided on one end and the other end of said roller block; wherein by moving the sensor block in a lengthwise direction with respect to the roller block, the first engaging portion of the sensor block is coupled to the first engaging portion of the roller block; and wherein by rotating the sensor block around the first engaging portion, with the first engaging portion of the sensor block being engaged with the first engaging portion of the roller block, the second engaging portion of the sensor block is coupled to the second engaging portion of the roller block.

14. The apparatus for reading character and image data according to claim 13, wherein the first engaging portion of said sensor block is an insert portion connected to one end of the sensor block; the first engaging portion of the roller block is an engagement hole provided on the holding portion on one end of the roller block; the second engaging portion of said sensor block is a catching member provided on the other end of the sensor block; and the second engaging portion of the roller block is a hook pivotably supported by the other end of the roller block.

15. The apparatus for reading character and image data according to claim 14, wherein a first contact terminal is provided on said holding portion provided on one end of said roller block; a second contact terminal is provided on said insertion portion connected to one end of said sensor block; wherein said first contact terminal comes in contact with said second contact terminal so that an electrical connection between the roller block and sensor block is established, when the first engaging portion of the sensor block is engaged with the first engaging portion of the roller block, and also the second engaging portion of the sensor block is engaged with the second engaging portion of the roller block.

16. The apparatus for reading character and image data according to claim 15, wherein either one of said first contact terminal or said second contact terminal is pressed against the other by a flexible member.

17. The apparatus for reading character and image data according to claim 14, wherein a flexible member, for continually pressing the hook to said catching member, and a sliding button, for turning the hook against the pressure of the flexible member toward the opposite direction of the catching portion, are provided on the end of the roller block where said hook is provided.

18. The apparatus for reading character and image data according to claim 13, wherein a protruding portion is provided on the surface of said roller block where the driving roller is exposed, and engagement hole, into which the protruding portion can be inserted, is provided at a position corresponding to said protruding portion on each of the surface of the sensor block where the reading surface of the sensor unit is located and the surface opposite thereto.

19. The apparatus for reading character and image data according to claim 1, wherein said coupling means comprises a support shaft interposed between one end of the roller block and one end of the sensor block to enable the sensor block to rotate with respect to the roller block, and a catching member formed and provided between the other end of the roller block and the other end of the sensor block to enable the other end of the sensor block to engage with and disengage from the other end of the roller block; wherein the sensor block can move between said first position and said second position with respect to the roller block by means of said support shaft and is held in either said first position or said second position by means of said catching member.

20. The apparatus for reading character and image data according to claim 19, wherein said support shaft comprises a first rotary portion, supported on one end of the roller block so as to rotate around a first axis set for the roller block, and a second rotary portion which extends from said first rotary portion in a perpendicular direction; the sensor block is able to rotate around the second axis which is set for the second rotary portion, with respect to the second rotary portion of the support shaft, as one end of said sensor block is engaged with the second rotary portion of said support shaft.

21. The apparatus for reading character and image data according to claim 20, wherein the first rotary portion of said support shaft is supported on one end of the roller block so as to be rotated around the first axis in the document feed direction by the driving roller of the roller block, and the sensor block is supported so as to be rotatable around the second axis perpendicular to the first axis, with respect to the second rotary portion of the support shaft; whereby the sensor block can be opened, with respect to the roller block, to a certain angle and rotated at least 180° around the first axis with respect to the second rotary portion of the support shaft, and can be switched from the first position, where the reading surface of the reading sensor faces the driving roller of the roller block, to the second position, where the reading surface of the reading sensor is turned away from the roller block, or from the second position to the first position.

22. The apparatus for reading character and image data according to claim 20 or 21, wherein said support shaft comprises a first tubular rotary portion and a second tubular rotary portion, extending from a central area of the first rotary portion in a direction perpendicular to the first rotary portion.

23. The apparatus for reading character and image data according to claim 22, wherein a hole is formed at one location on said first rotary portion so that a cable from the sensor block passes through the second rotary portion to enter the first rotary portion and then passes through said hole formed in the first rotary portion, to the outside and then reaches the roller block, whereby an electrical connection between the sensor block and roller block is established with this cable.

24. The apparatus for reading character and image data according to claim 20, wherein the first rotary portion of said support shaft is supported on one end of the roller block so as to be rotatable around the first axis, perpendicular to the surface of the document fed by the driving roller of the roller block; and the sensor block is supported so as to be rotatable around the second axis perpendicular to the first axis, with respect to the second rotary portion of the support shaft; whereby the sensor block can be rotated to an angle of at least 180° with respect to the roller block, can be rotated at least 180° around the first axis with respect to the second rotary portion of the support shaft, and can be switched from the first position, where the reading surface of the reading sensor faces the driving roller of the roller block, to the second position, where the reading surface of the reading sensor is turned away from the roller block, or from the second position to the first position.

25. The apparatus for reading character and image data according to claim 24, wherein said support shaft comprises a first tubular rotary portion and a second tubular rotary portion, extending from one end of the first rotary portion in a direction perpendicular to the first rotary portion.

26. The apparatus for reading character and image data according to claim 25, wherein a hole is formed at one location on said second rotary portion so that a cable from the sensor block passes through said hole, enter the second rotary portion, and then passes through the first rotary portion and reaches the roller block, whereby an electrical connection between the sensor block and roller block is established with this cable.

27. The apparatus for reading character and image data according to claim 1, wherein a document tray, for supporting the document passing through the space between the roller block and said sensor block, is mounted on said roller block.

28. The apparatus for reading character and image data according to claim 27, wherein said document tray is mounted rotatably with respect to the roller block.

29. The apparatus for reading character and image data according to claim 28, wherein a depressed portion, for housing said document tray, is formed in said roller block.

30. The apparatus for reading character and image data according to claim 27, wherein said document tray is mounted removably on the roller block.

31. The apparatus for reading character and image data according to claim 27, wherein said document tray comprises a single panel having an L-shaped cross section.

* * * * *